US012003117B2

(12) United States Patent
Avestruz et al.

(10) Patent No.: US 12,003,117 B2
(45) Date of Patent: Jun. 4, 2024

(54) FOREIGN OBJECT DETECTION IN WIRELESS POWER TRANSFER

(71) Applicant: The Regents of the University of Michigan, Ann Arbor, MI (US)

(72) Inventors: Al-Thaddeus Avestruz, Ann Arbor, MI (US); Sung Yul Chu, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 17/348,645

(22) Filed: Jun. 15, 2021

(65) Prior Publication Data

US 2021/0391758 A1 Dec. 16, 2021

Related U.S. Application Data

(60) Provisional application No. 63/039,139, filed on Jun. 15, 2020.

(51) Int. Cl.
*H02J 50/60* (2016.01)
*H02J 50/10* (2016.01)

(52) U.S. Cl.
CPC .............. *H02J 50/60* (2016.02); *H02J 50/10* (2016.02)

(58) Field of Classification Search
CPC .................................. H02J 50/60; H02J 50/10
See application file for complete search history.

(56) References Cited

U.S. PATENT DOCUMENTS

| 9,474,031 | B1 * | 10/2016 | Sedzin | H02J 50/10 |
| 9,536,656 | B2 * | 1/2017 | Oettinger | H02J 50/60 |
| 2011/0128015 | A1 * | 6/2011 | Dorairaj | H02J 50/10 |
| | | | | 307/104 |
| 2012/0091989 | A1 * | 4/2012 | Uramoto | H02J 50/40 |
| | | | | 324/76.11 |

(Continued)

OTHER PUBLICATIONS

Jeong, "Dual-Purpose Nonoverlapping Coil Sets as Metal Object and Vehicle Position Detections for Wireless Stationary EV Chargers," IEEE Transactions on Power Electronics, vol. 33, No. 9, Sep. 2018 (Year: 2018).*

(Continued)

*Primary Examiner* — Carlos Amaya
(74) *Attorney, Agent, or Firm* — Lempia Summerfield Katz LLC

(57) ABSTRACT

A system for wireless power transfer includes a plurality of transfer elements, each transfer element of the plurality of transfer elements being configured as a transmitter for the wireless power transfer or a receiver for the wireless power transfer, a plurality of sensors, each sensor of the plurality of sensors being positioned relative to the plurality of transfer elements and configured to generate sensor data indicative of a field implementing the wireless power transfer, and a processor coupled to the plurality of sensors and configured to determine an estimate of a terminal variable level in a respective transfer element of the plurality of transfer elements based on the sensor data, and to determine whether a foreign object is affecting the wireless power transfer based on whether the estimated terminal variable level is different from another assessment of the terminal variable level by more than a threshold.

18 Claims, 20 Drawing Sheets

(56) References Cited

U.S. PATENT DOCUMENTS

| | | | | |
|---|---|---|---|---|
| 2012/0175967 | A1* | 7/2012 | Dibben | H02J 7/007182 |
| | | | | 307/104 |
| 2012/0313579 | A1* | 12/2012 | Matsumoto | H02J 7/00304 |
| | | | | 320/108 |
| 2014/0111154 | A1* | 4/2014 | Roy | B60L 53/124 |
| | | | | 320/108 |
| 2014/0225628 | A1* | 8/2014 | Yoon | G01R 29/0814 |
| | | | | 324/654 |
| 2014/0239735 | A1* | 8/2014 | Abe | B60L 53/126 |
| | | | | 307/104 |
| 2015/0263532 | A1* | 9/2015 | Van Wageningen | H02J 50/60 |
| | | | | 307/104 |
| 2015/0331135 | A1* | 11/2015 | Widmer | G01V 3/101 |
| | | | | 324/234 |
| 2017/0005524 | A1* | 1/2017 | Akuzawa | H02J 50/12 |
| 2017/0141604 | A1* | 5/2017 | Park | H04B 5/0031 |
| 2017/0288412 | A1* | 10/2017 | Yamamoto | H02J 50/402 |
| 2017/0310166 | A1* | 10/2017 | Huang | H01F 1/00 |
| 2018/0069435 | A1* | 3/2018 | Sakata | H02J 50/70 |
| 2018/0072166 | A1* | 3/2018 | Percebon | B60L 53/124 |
| 2018/0323659 | A1* | 11/2018 | Maniktala | H02J 50/10 |
| 2019/0011523 | A1* | 1/2019 | Avestruz | G01R 35/005 |
| 2020/0169124 | A1* | 5/2020 | Mehas | H02J 50/60 |
| 2021/0119494 | A1* | 4/2021 | Mao | H02J 50/12 |
| 2021/0152030 | A1* | 5/2021 | Byun | H02J 50/12 |

OTHER PUBLICATIONS

Chu, "Transfer-power measurement: A non-contact method for fair and accurate metering of wireless power transfer in electric vehicles,"2017 IEEE 18th Workshop on Control and Modeling for Power Electronics (COMPEL), 2017, pp. 1-8 (Year: 2017).*

C. C. Mi, G. Buja, S. Y. Choi, and C. T. Rim, "Modern advances in wireless power transfer systems for roadway powered electric vehicles," IEEE Transactions on Industrial Electronics, vol. 63, pp. 6533-6545, Oct. 2016.

C. R. Sullivan, "Computationally efficient winding loss calculation with multiple windings, arbitrary waveforms, and two-dimensional or three-dimensional field geometry," IEEE Transactions on Power Electronics, vol. 16, pp. 142-150, Jan. 2001.

D. Vyroubal, "Impedance of the eddy-current displacement probe:the transformer model," IEEE Transactions on Instrumentation and Measurement, vol. 53, pp. 384-391, Apr. 2004.

G. A. Covic and J. T. Boys, "Modern trends in inductive power transfer for transportation applications," IEEE Journal of Emerging and Selected Topics in Power Electronics, vol. 1, pp. 28-41, Mar. 2013.

J. Garca-Martn, J. Gmez-Gil, and E. Vzquez-Snchez, "Nondestructive techniques based on eddy current testing," Sensors, vol. 11, No. 3, pp. 2525-2565, 2011.

J. Poon, P. Jain, I. C. Konstantakopoulos, C. Spanos, S. K. Panda, and S. R. Sanders, "Model-based fault detection and identification for switching power converters," IEEE Transactions on Power Electronics,vol. 32, pp. 1419-1430, Feb. 2017.

Kim et al., "Coil Design and Shielding Methods for a Magentic Resonant Wireless Power Transfer System", Proceedings of the IEEE, Jun. 2013, pp. 1332-1342, vol. 101, No. 6.

Xiang, Z. Zhu, J. Tian, and Y. Tian, "Foreign object detection in a wireless power transfer system using symmetrical coil sets," IEEE Access, pp. 1-1, 2019.

N. Kuyvenhoven, C. Dean, J. Melton, J. Schwannecke, and A. E.Umenei, "Development of a foreign object detection and analysis method for wireless power systems," in 2011 IEEE Symposium on Product Compliance Engineering Proceedings, pp. 1-6, Oct. 2011.

S. Babic, F. Sirois, C. Akyel, and C. Girardi, "Mutual inductance calculation between circular filaments arbitrarily positioned in space: Alternative to grover's formula," IEEE Transactions on Magnetics,vol. 46, pp. 3591-3600, Sep. 2010.

S. Fukuda, H. Nakano, Y. Murayama, T. Murakami, O. Kozakai, andK. Fujimaki, "A novel metal detector using the quality factor of the secondary coil for wireless power transfer systems," in 2012 IEEEMTT-S International Microwave Workshop Series on Innovative Wireless Power Transmission: Technologies, Systems, and Applications, pp. 241-244, May 2012.

S. Y. Choi, B. W. Gu, S. Y. Jeong, and C. T. Rim, "Advances in wireless power transfer systems for roadway-powered electric vehicles," IEEE Journal of Emerging and Selected Topics in Power Electronics, vol. 3,pp. 18-36, Mar. 2015.

S. Y. Chu and A. Avestruz, "Transfer-power measurement: A noncontact method for fair and accurate metering of wireless power transfer in electric vehicles," in 2017 IEEE 18th Workshop on Control and Modeling for Power Electronics (COMPEL), pp. 1-8, Jul. 2017.

S. Y. Chu, X. Cui, and A. Avestruz, "Accurate transfer-power measurement for wireless charging of electric vehicles under misalignment," in 2018 IEEE Pels Workshop on Emerging Technologies: Wireless Power Transfer (Wow), pp. 1-6, Jun. 2018.

S. Y. Jeong, H. G. Kwak, G. C. Jang, S. Y. Choi, and C. T. Rim, "Dual-purpose nonoverlapping coil sets as metal object and vehicle position detections for wireless stationary ev chargers," IEEE Transactions on Power Electronics, vol. 33, pp. 7387-7397, Sep. 2018.

S. Y. Jeong, V. X. Thai, J. H. Park, and C. T. Rim, "Self-inductance-based metal object detection with mistuned resonant circuits and nullifying induced voltage for wireless ev chargers," IEEE Transactions on Power Electronics, vol. 34, pp. 748-758, Jan. 2019.

Z. N. Low, J. J. Casanova, P. H. Maier, J. A. Taylor, R. A. Chinga, and J. Lin, "Method of load/fault detection for loosely coupled planar wireless power transfer system with power delivery tracking," IEEE Transactions on Industrial Electronics, vol. 57, pp. 1478-1486, Apr. 2010.

* cited by examiner

FOREIGN OBJECT DETECTION IN WIRELESS POWER TRANSFER

CROSS-REFERENCE TO RELATED APPLICATION

This application claims the benefit of U.S. provisional application entitled "Foreign Object Detection in Wireless Power Transfer," filed Jun. 15, 2020, and assigned Ser. No. 63/039,139, the entire disclosure of which is hereby expressly incorporated by reference.

BACKGROUND OF THE DISCLOSURE

Field of the Disclosure

The disclosure relates generally to wireless power transfer.

Brief Description of Related Technology

Wireless power transfer (WPT) is predicted to emerge as the primary mode of electric vehicle (EV) charging, with safety as one concern to adoption. Foreign objects near magnetic wireless power transfer systems are one hazard because they can heat from eddy currents and cause a fire. In fact, SAE Standard J2954 mandates foreign object detection (FOD).

Several methods for foreign object detection have been previously presented, including using differences in the induced voltages of sets of sense coils, the impedance of the sensing patterns, the quality factor of the receiver coil, eddy loss estimation, or variation in the transmit and receive coil voltages and currents.

SUMMARY OF THE DISCLOSURE

In accordance with one aspect of the disclosure, a system for wireless power transfer includes a plurality of transfer elements, each transfer element of the plurality of transfer elements being configured as a transmitter for the wireless power transfer or a receiver for the wireless power transfer, a plurality of sensors, each sensor of the plurality of sensors being positioned relative to the plurality of transfer elements and configured to generate sensor data indicative of a field implementing the wireless power transfer, and a processor coupled to the plurality of sensors and configured to determine an estimate of a terminal variable level in a respective transfer element of the plurality of transfer elements based on the sensor data, and to determine whether a foreign object is affecting the wireless power transfer based on whether the estimated terminal variable level is different from another assessment of the terminal variable level by more than a threshold.

In accordance with another aspect of the disclosure, a method for foreign object detection in a wireless power transfer system includes determining, by a processor, using a plurality of sensors of the wireless power transfer system, a first assessment of a terminal variable level in a transfer element of the wireless power transfer system, each sensor of the plurality of sensors being positioned relative to the transfer element to generate sensor data indicative of a field implementing wireless power transfer via the transfer element, determining a second assessment of the terminal variable level in the transfer element, determining, by the processor, a difference between the first assessment and the second assessment, and providing, by the processor, an indication of whether a foreign object is obstructing the wireless power transfer based on whether the difference exceeds a threshold.

In accordance with yet another aspect of the disclosure, a method of calibrating a wireless power transfer system for foreign object detection includes obtaining, by a processor, sensor data indicative of a field implementing wireless power transfer, the sensor data generated by a plurality of sensors, each sensor of the plurality of sensors being positioned relative to a plurality of transfer elements of the wireless power transfer system, obtaining, by the processor, a first assessment of a terminal variable level in a respective transfer element of the plurality of transfer elements, and determining, by the processor, a set of coefficients to translate the obtained sensor data into a second assessment of the terminal variable level in the respective transfer element. The first and second assessments are representative of operation of the wireless power transfer system without a foreign object present.

In connection with any one of the aforementioned aspects, the devices and/or methods described herein may alternatively or additionally include or involve any combination of one or more of the following aspects or features. Each transfer element of the plurality of transfer elements includes a transfer coil. Each sensor of the plurality of sensors includes a sense coil. The terminal variable level is a current level. The system further includes a transfer coil current sensor configured to generate a measurement of the terminal variable level in the respective transfer element. The processor is configured to determine whether a foreign object is affecting the wireless power transfer based on whether the estimated terminal variable level is different from the measurement. The system further includes a second plurality of sensors, each sensor of the second plurality of sensors is positioned relative to the plurality of transfer elements and configured to generate further sensor data indicative of the field representative of the wireless power transfer. The processor is coupled to the second plurality of sensors and configured to determine a further estimate of the terminal variable level in the respective transfer element based on the further sensor data, and to determine whether a foreign object is affecting the wireless power transfer based on the further estimate. The plurality of sensors includes more than two sensors such that the processor is configured to determine whether a foreign object is affecting the wireless power transfer over a range of misalignment between the plurality of transfer elements. The processor is further configured to determine an amount of power dissipated in the foreign object based on the sensor data. The processor is further configured to provide an indication of whether the amount of power dissipated in the foreign object exceeds a threshold. The sensor data includes data representative of an open circuit voltage across each sensor of the plurality of sensors. The respective transfer element is configured as a transmitter coil. The respective transfer element is configured as a receiver coil. Each sensor of the plurality of sensors is positioned between the plurality of transfer elements. Each sense coil of the plurality of sense coils is disposed in a co-planar arrangement. Each sensor of the plurality of sensors includes a single turn coil. Determining the second assessment includes measuring, with a transfer element sensor, the terminal variable level in the transfer element. Determining the second assessment includes determining, by the processor, the second assessment based on further sensor data generated by a second plurality of sensors of the wireless power transfer system, each sensor of the second plurality of sensors being positioned relative to the transfer element such that the further sensor data is indicative of the field. The method further includes determining, by the processor, an amount of power dissipated in the foreign object based on the sensor data. The indication specifies whether the amount of power dissipated in the foreign object exceeds a threshold. Determining the set of coefficients includes implementing a linear regression optimization based on the sensor data. The sensor data and the assessment of the current level are obtained for a range of loads on the wireless power transfer system. The sensor data and the assessment of the current level are obtained over a range of misalignment in the wireless power transfer system.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
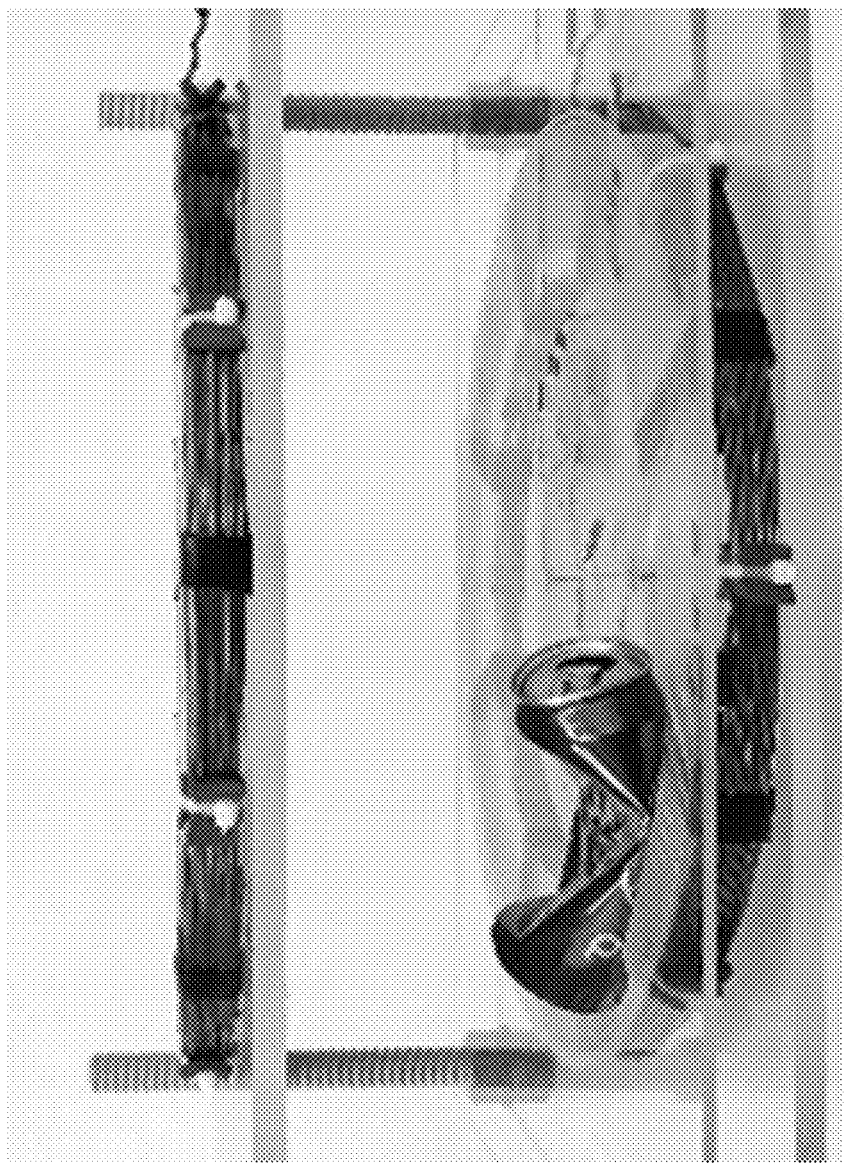
FIG. 1 is a perspective view of a wireless power transfer system with foreign object detection in accordance with one example in which an aluminum can intrudes into the wireless power transfer.

The embodiments of the disclosed devices, systems, and methods may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Devices, systems, and methods for detection of a foreign object in wireless power transfer are described. The disclosed devices, systems, and methods may rely on the disturbance in the electromagnetic field present during the wireless power transfer to detect and assess foreign objects.

When a foreign object encroaches, the object perturbs the electromagnetic field from that generated by the transmitter (Tx) and receiver (Rx) coil currents alone. The disturbance and, thus, foreign objects may be detected using multiple (e.g., two) open-circuited single-turn sense coils to estimate a transfer coil current (e.g., either a transmitter coil current or a receiver coil current) or other terminal variable level. The estimated current may then be compared to a measured transfer coil current or another estimation (e.g., based on further sense coils). The error or offset, e.g., between the estimated and measured values, may then be used as a metric for foreign object detection.

A technique for transfer power measurement (TPM) may be used to support the foreign object detection. The technique utilizes a model of the transmitter, receiver, and sense coils. A transformer model for the wireless power transfer coil voltages and currents is derived from the electromagnetic field, which can be reconstructed from a linear combination of sense coil voltages. This model may be considered or treated as the normal model, or normal or unobstructed configuration, which may be extended to an adverse model, or obstructed configuration, by the inclusion of electromagnetic coupling from foreign objects. The deviation of the adverse model from the normal model, then indicates the measure of disturbance. This normal model is generally applicable to magnetic wireless power transfer, which has been shown to be invariant to power and receiver coil misalignment, thus making this electromagnetic model-based foreign object detection (EM-FOD) appealing. The frequency used in the transmitter coil during foreign object detection may be different than the frequency used for wireless power transfer. Foreign object detection may or may not be simultaneous with wireless power transfer. Simultaneous foreign object detection may occur at frequencies different than that used for wireless power transfer. For example, a different frequency for the purposes of foreign object detection may be superimposed on the wireless power transfer current.

Further details regarding the use of multiple sense coils for transfer power measurement and derivation of transmitter, receiver voltages or currents, are set forth in U.S. Patent Publication No. 2019/0011523 ("Wireless Power Transfer Metering"), the entire disclosure of which is hereby incorporated by reference.

The approach to foreign object detection implemented by the disclosed devices, systems, and methods presents a number of benefits, including, for instance, (i) invariance to coil resistances, losses, and output loads, hence also power level, allowing low-power tests prior to startup; (ii) invariance to coil misalignment; (iii) wide dynamic range; (iv) small number and small-sized sense coils whose electromagnetic contribution is negligible; (v) cost-effectiveness—using the same sense coils for metering (TPM); (vi) no sensitivity dead zones; all foreign objects within the electromagnetic space of wireless power transfer can be detected; (vii) access is unneeded to the receiver coil (mobile) current and voltage; only the transmitter or receiver coil (stationary) current is involved.

Although described in connection with detection of metal objects, such as an aluminum can, the disclosed devices, systems, and methods may be used to detect a wide variety of foreign objects. For instance, non-metal objects, such as a bag or other volume of a saline solution, is detectable via the disclosed techniques. The saline solution may be a proxy for, or representative of, an animal or other tissue sample. The disclosed techniques are also not limited to detecting objects having a uniform composition. For instance, composite objects, such as a small disposable lighter, may be detected. Other aspects of the objects in addition to object composition may also vary. For instance, the size of the objects may be much smaller, such as a nickel coin.

FIG. 1 depicts an example of a wireless power transfer system in which an aluminum can intrudes into the wireless power transfer between a transmit coil and a receive coil.

Figure 2:
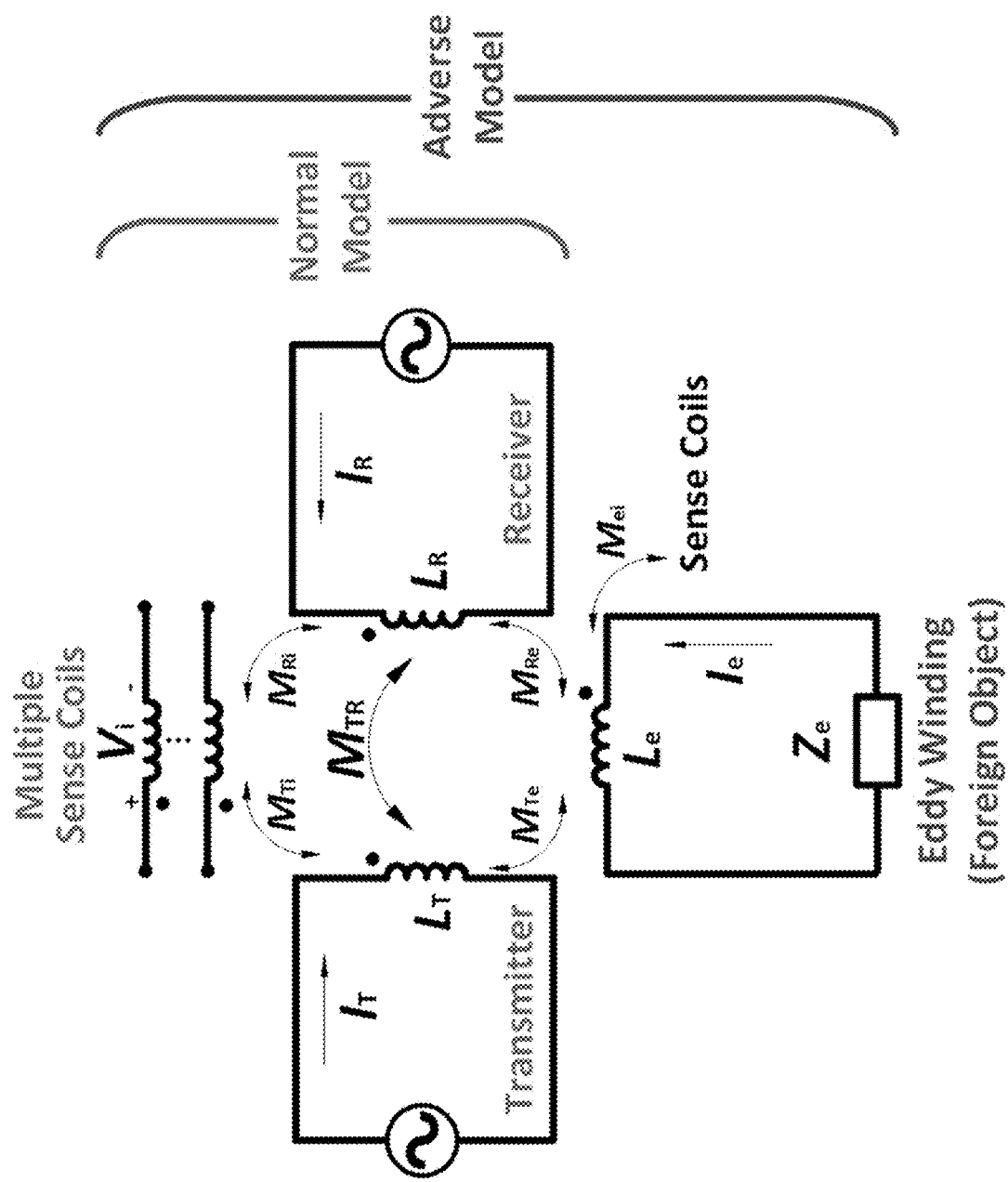
FIG. 2 is a schematic view of a wireless power transfer system with foreign object detection in accordance with one example.

Foreign objects can be detected by quantifying the deviation from the normal electromagnetic model, or unobstructed configuration, for wireless power transfer. FIG. 2 shows the normal model along with the extension to the adverse model, or obstructed configuration, that includes a foreign object electromagnetically coupling.

The normal model includes the transmitter, receiver, and sense coils. The variables in the model are the transmitter and receiver coil voltages and currents, which are derived from the electromagnetic field. A linear combination of the sense coil voltages can reconstruct the transmitter and receiver voltages and currents. The coupling between a foreign object and other coils can be analyzed by an eddy-current winding model. The eddy current in the foreign object can be modeled as a transformer winding, as shown in FIG. 2. The deviation of the adverse model from the normal model can then be quantified (discussed further hereinbelow). The geometric parameters are the coefficients used to reconstruct the transmitter current from the linear combination of sense coil voltages, which become incorrect in the adverse model. In some cases, the transmitter coil current is chosen as the variable for comparison because: (i) the transmitter coil is stationary, inaccessible to users, and thus secured; (ii) the voltage measured at the electrical terminal of the coil results in an inaccurate estimation of the model because it contains not only the coil voltage but also the voltage drops from winding and eddy losses. Other parameters may be used in other cases, including, for instance, the receiver coil current. Accordingly, the term "transfer coil" is used herein to refer to either the transmitter or the receiver coil.

Calibration of the geometric parameters is initially performed in the normal model (without foreign objects). The parameters contain the magnetic and geometric information among the transmitter, receiver, and sense coils. After calibration, in some cases, the disclosed devices, systems, and methods may use measurements of the transmitter coil current and sense coil voltages. In other cases, further coils are used to derive another estimate of the transmitter (or other transfer) coil current, as described below. An estimation of the transmitter coil current is constructed from a linear combination of the sense coil voltages using the pre-calibrated geometric parameters. Foreign objects are detected from the error between the measured and estimated transmitter current. A foreign object in the electromagnetic space causes an error, or offset, from the additional coupling between the foreign object and other coils.

Calibration using example foreign objects may be used to determine the threshold for determining whether an action is warranted for a particular foreign object detection. For instance, the action may include shutting down wireless power transfer. In other embodiments, electromagnetic simulation, for instance finite-element, may be used instead of or to supplement calibration. In other embodiments, calibration or electromagnetic simulation may be used to determine the mathematical relationship between the sense coil voltages and the power dissipated by the foreign object. For instance, this mathematical relationship can be determined by linear regression, curve fitting, or machine learning.

An example that determines the deviation from the normal electromagnetic model through transmitter current estimation using sense coil voltages is now described. The two sense coil voltages1 (V1; V2) in the normal model are superpositions of the induced voltages from the transmitter and receiver coil currents ($I_T$; $I_R$). Note that, in this example, there is no self-induced voltage in the sense coils; the open-circuited sense coils currents are zero.

$$V_1 = jwM_{T1}I_T + jwM_{R.1}I_R.$$

$$V_2 = jwM_{T2}I_T + jwM_{R.2}I_R. \quad (1)$$

The transmitter and receiver coil currents can then be represented as a linear combination of the sense coil voltages, as follows.

$$\begin{pmatrix} I_T \\ I_R \end{pmatrix} = \frac{1}{\mathcal{D}} \begin{pmatrix} M_{R2} & -M_{R1} \\ -M_{T2} & M_{T1} \end{pmatrix} \begin{pmatrix} \frac{V_1}{j\omega} \\ \frac{V_2}{j\omega} \end{pmatrix} \quad (2)$$

where each subscript T and R refer to the transmitter and receiver coils, respectively; 1 and 2 refer to the sense coils;

$M_{i,j}$ is the mutual inductance between coils i and j; D is the determinant of the mutual inductance matrix; and, ω is the angular frequency.

The transmitter current can be re-written using the geometric parameters $\alpha_i$, as follows.

$$I_T = \alpha_1 \frac{V_1}{j\omega} + \alpha_2 \frac{V_2}{j\omega} \tag{3}$$

where, $$\alpha_1 = \frac{M_{R2}}{\mathcal{D}}, \alpha_2 = -\frac{M_{R1}}{\mathcal{D}}, \tag{4}$$

$$\mathcal{D} = M_{T1} M_{R2} - M_{R1} M_{T2}.$$

Deviation of the transmitter current Estimation in the adverse, or obstructed, model or configuration is now described. The transmitter, receiver, sense coils, and eddy winding of a foreign object (subscript: e) are included in the adverse model as shown in FIG. 2. The two sense coil voltages then have the additional induced voltages (a) and (b), from the eddy winding current ($I_e$) as shown below.

$$V_1 = j\omega M_{T:1} I'_T + j\omega M_{R:1} I'_R + \underbrace{j\omega M_{e:1} I_e}_{(a)} \tag{5}$$

$$V_2 = j\omega M_{T:2} I'_T + j\omega M_{R:2} I'_R + \underbrace{j\omega M_{e:2} I_e}_{(b)}$$

where the transmitter and receiver coil currents of the adverse model are $I'_T$ and $I'_R$. Then, expression (5) can be re-written with respect to the deviation of the geometric parameter ($\Delta M_{i,j}$), as follows.

$$V_1 = j\omega(M_{T:1} + \Delta M_{T:1})I'_T + j\omega(M_{R:1} + \Delta M_{R:1})I'_R \tag{6}$$

$$V_2 = j\omega(M_{T:2} + \Delta M_{T:2})I'_T + j\omega(M_{R:2} + \Delta M_{R:2})I'_R,$$

where, $$\Delta M_{i,j} = M_{e:i} M_{e:j} \frac{-j\omega Z_e - \omega^2 L_e}{Z_e^2 + \omega^2 L_e^2}. \tag{7}$$

The eddy winding current $I_e$ in expression (5) can be represented as the superposition of the transmitter and receiver coil currents, which results in expression (7). The transmitter coil current ($I'_T$) of the adverse model is therefore as follows.

$$I'_T = \alpha'_1 \frac{V_1}{j\omega} + \alpha'_2 \frac{V_2}{j\omega}, \tag{8}$$

where, $\alpha'_1 = \frac{M_{R:2} + \Delta M_{R:2}}{\mathcal{D}'}, \alpha'_2 = \frac{-M_{R:1} - \Delta M_{R:1}}{\mathcal{D}'},$ \tag{9}

$$\mathcal{D}' = \mathcal{D} + (M_{T:1}\Delta M_{R:2} - M_{R:1}\Delta M_{R:2}) +$$

$$(M_{T:1}\Delta M_{T:1} - M_{T:2}\Delta M_{R:1}) + (\Delta M_{T:1}\Delta M_{R:2} - \Delta M_{R:1}\Delta M_{T:2}).$$

The transmitter coil current relative error (ε) between the normal model and the adverse model is as follows.

$$\epsilon = \frac{I'_T - I_T}{I'_T} = 1 - \left(\frac{\mathcal{D}'}{\mathcal{D}} - \zeta\right) \tag{10}$$

where, \tag{11}

$$\zeta = \frac{\Delta M_{R:2} - \Delta M_{R:1} \nu}{M_{R:2} + \Delta M_{R:2} - M_{R:1}\nu - \Delta M_{R:1}\nu},$$

$$\nu = \frac{M_{T:2} + \Delta M_{T:2} + (M_{R:2} + \Delta M_{R:2})\gamma}{M_{T:1} + \Delta M_{T:1} + (M_{R:1} + \Delta M_{R:1})\gamma},$$

$$\gamma = \frac{-\omega^2 LR + j\omega M_{T:R} Z_R}{Z_R^2 + \omega^2 L_R^2}.$$

$Z_R$ is the equivalent output impedance of the receiver coil. Note that if there is no foreign object, then D'=D, and ζ is zero, and therefore the relative error goes to zero.

The disclosed technique for electromagnetic model-based foreign object detection provides an effective detection metric as the sequent error in the transmitter coil current reconstruction when normal geometric parameters, $\alpha_1$ and $\alpha_2$, are used for the reconstruction. The detection metric Γ is the absolute percentage of the sequent error $\varepsilon_d$, as follows.

$$\Gamma = \varepsilon_d = \left|\frac{I_T - \hat{I}_T}{I_T}\right| \times 100(\%), \tag{1}$$

where
$I_T$: True Tx current measured by a current sensor,
$\hat{I}_T$: Reconstructed Tx current by sense coil voltages $V_1$, $V_2 = \alpha_1 V_1 + \alpha_2 V_2$.

Figure 3:
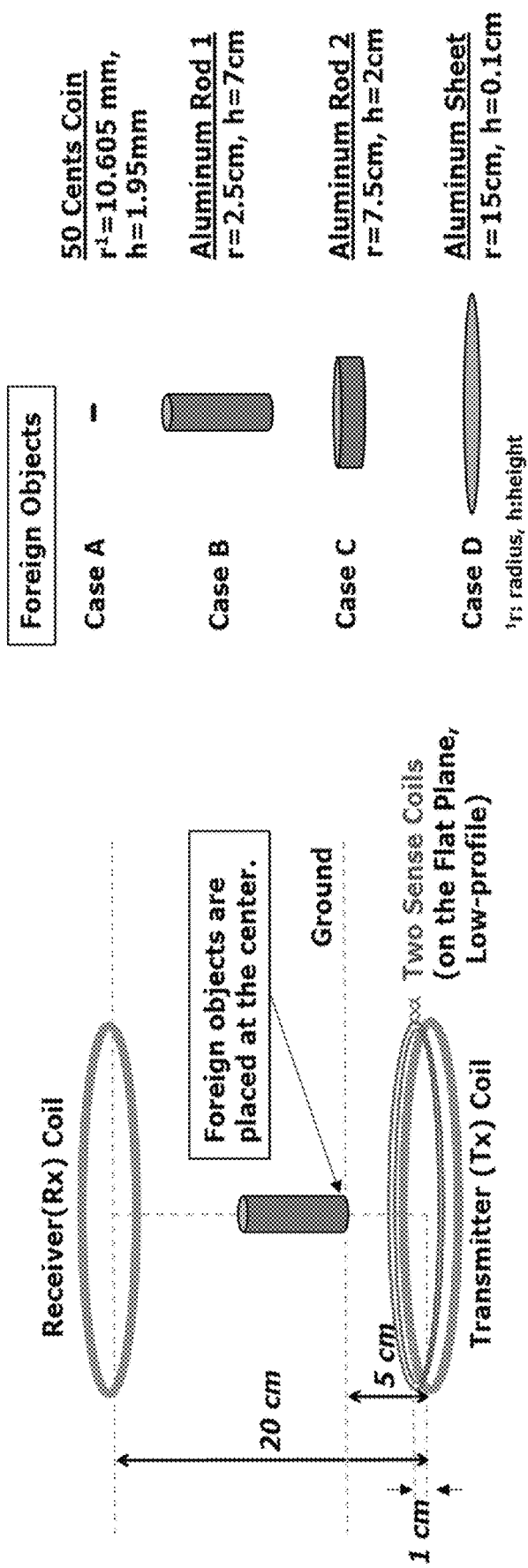
FIG. 3 is a schematic view of a wireless power transfer system having multiple sense coils for foreign object detection in accordance with one example.
Figure 4:
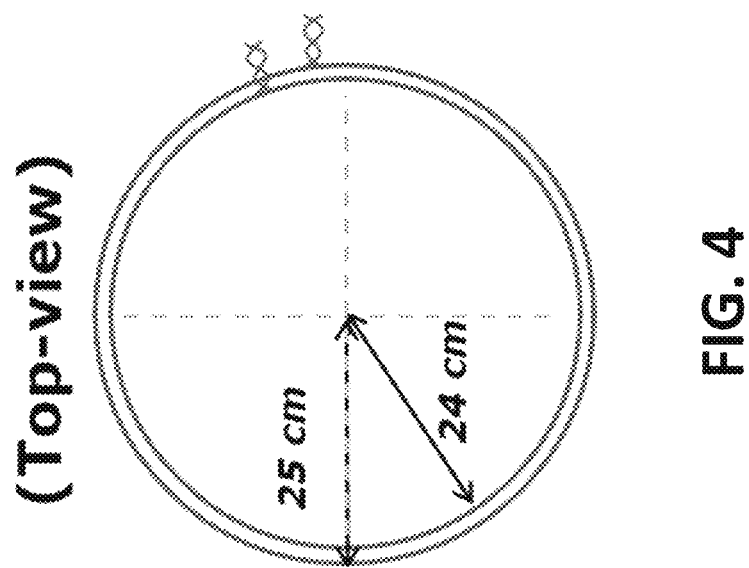
FIG. 4 is a schematic view of multiple open-circuited, single turn sense coils disposed in the same flat plane in accordance with one example.
Figure 5:
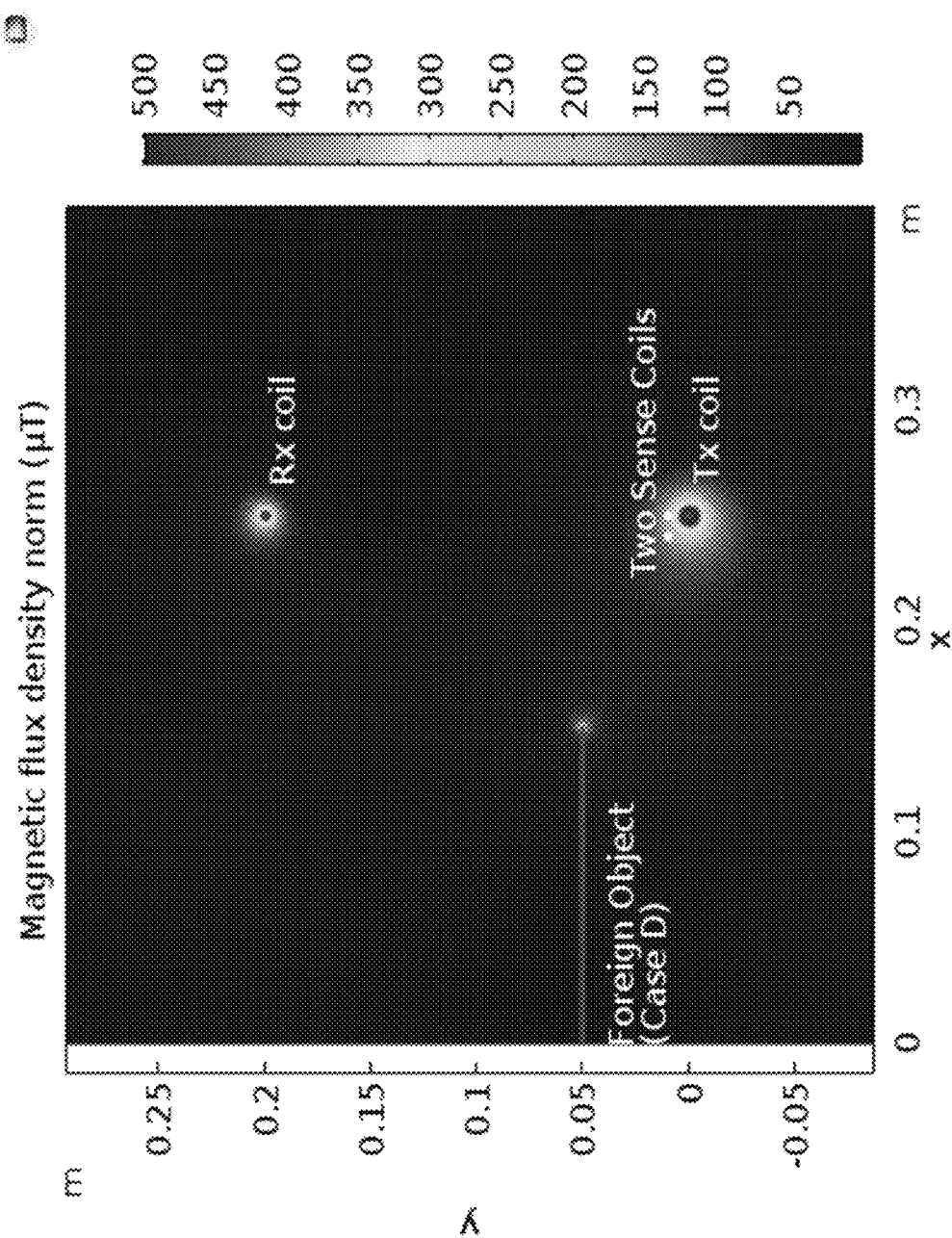
FIG. 5 depicts a graphical plot of simulation results of foreign object detection in accordance with one example, the plot presenting a color map in which the magnetic flux density norm is bounded for better visualization.

The electromagnetic model-based foreign object detection of the disclosed systems and methods was verified through finite element (FEM) simulation in COMSOL. FIG. 3 shows the configurations of the disclosed system for the simulations. In this example, two open-circuited sense coils (25 and 24 cm radii) were placed on the same flat plane, as shown in FIG. 4, which, in this example, was 1 cm above the transmitter coil. Four different foreign objects were placed on the ground, which, in this example, was 5 cm above the transmitter coil, considering the mounting height of the transmitter coil. Two-dimensional axisymmetric FEM simulations were performed, as shown in FIG. 5. Sense coil voltages were obtained when the transmitter and receiver coils were excited by current sources. Alternatively, the transmitter and receiver coils may be excited by voltage sources and either or both the transmitter and receiver coil currents are measured.

Following the foreign object detection strategy described above, the geometric parameters ($\alpha_{1,2}$) were calibrated initially in the normal model without any foreign objects. Enough data-points were used to calibrate the geometric parameters accurately. In this simulation, the size of the load coupled to the receiver was varied. In this example, the receiver coil currents were varied over n data points, corresponding to different output load resistances in the receiver.

From the n data points, the calibration matrix of sense coil voltages (V), the transmitter current vector ($I_T$), and geometric parameters vector (α), can be constructed as follows.

$$\underline{V} = \frac{1}{j\omega}\begin{pmatrix} V_1(1) & V_2(1) \\ V_1(2) & V_2(2) \\ \vdots & \vdots \\ V_1(n) & V_2(n) \end{pmatrix}, \tag{13}$$

$$\alpha = [\alpha_1 \ \alpha_2]^T,$$

$$I_T = [I_T(1) \ I_T(2) \ \ldots \ I_T(n)]^T,$$

following the same form as (3)

$$I_T = V\alpha.$$

The geometric parameters ($\alpha_{1,2}$) can then be calibrated using a least-squares technique as follows (other linear regression technique may be used).

$$\alpha = (V^T V)^{-1} V^T I_T. \quad (14)$$

The transmitter current estimation errors were determined for each data point using leave-one-out cross-validation (LOOCV). The percentage error ($\delta_I$) of the transmitter current estimation is as follows.

$$\delta_I = \left| \frac{I_T - I_{T,est.}}{I_T} \right| \times 100(\%) \quad (15)$$

where, $$I_{T,est.} : \text{Estimated Tx current} = \alpha_1 \frac{V_1}{j\omega} + \alpha_2 \frac{V_2}{j\omega}. \quad (16)$$

Note that in expression (15), $I_T$ is the measured transmitter current. In other examples, the receiver current may be used. In still other cases, the transmitter current or the receiver current may be derived from further sense coil voltage measurements. For instance, a set of combinations of sense coil voltages may be used to estimate the transmitter or receiver current and compare with the transmitter or receiver current estimation from a different set of combinations of sense coil voltages.

In other embodiments, for the purposes of foreign object detection estimates of transfer power may be used to determine foreign object detection. For instance, a set of combinations of sense coil voltages may be used to estimate transfer and compared with the transfer power estimation from a different set of combinations of sense coil voltages.

In other embodiments, for the purposes of foreign object detection, a predetermined expression or relationship using sense coil voltages may be used to determine foreign object detection. The results of this formula may or may not correspond to a physical quantity, but the result of this formula may be compared to a threshold to determine if there is a foreign object. The formula may be used to determine characteristics of the foreign object. For instance, physical size, power loss, material, or electrical conductivity may be determined. The mathematical formula may be determined through calibration or electromagnetic simulation using for instance regression, curve fitting, or machine learning. The mathematical formula may also be determined using prior assumptions about the foreign object characteristics. For instance, these characteristics may be the mutual inductances to the sense coils, transmitter coils, and/or receiver coils.

Figure 6:
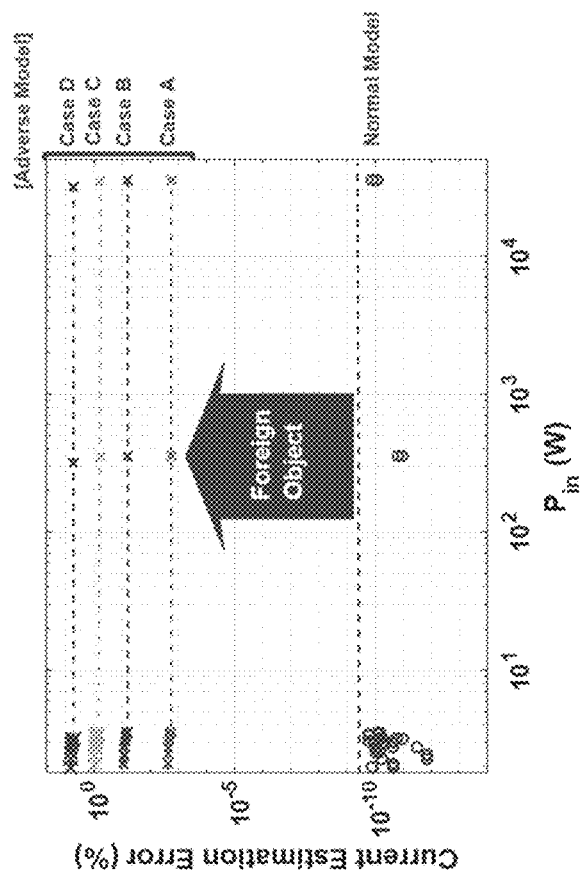
FIG. 6 depicts graphical plots of transmitter current estimation error or offset levels in accordance with several examples.
Figure 6:
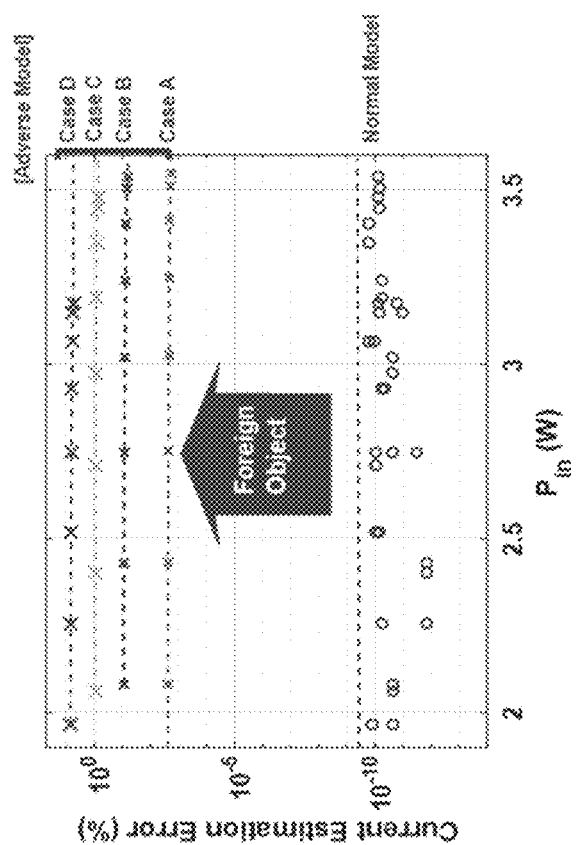

In this example simulation, the receiver currents were varied over eight data points, which generated small transmitter powers (2.1 to 3.54 W), as shown in FIG. 6. The transmitter power is the real power, e.g., measured at the transmitter coil terminal. In the normal model without foreign objects (circles in the plot), the geometric parameters were calibrated, and then the transmitter current was estimated. According to LOOCV, this results in an accurate estimation.

After calibration, the transmitter currents were estimated again with the same normal model for each case of a foreign object, which is shown in FIG. 3. For the same eight data points, the transmitter currents were estimated with the geometric parameters (which were calibrated without foreign objects). The first plot of FIG. 6 shows that the transmitter current estimation errors increase significantly when a normal model is assumed when there are foreign objects. Note that the errors, or offsets, are plotted in log scale highlighting the wide dynamic range of the measurement.

Figure 7:
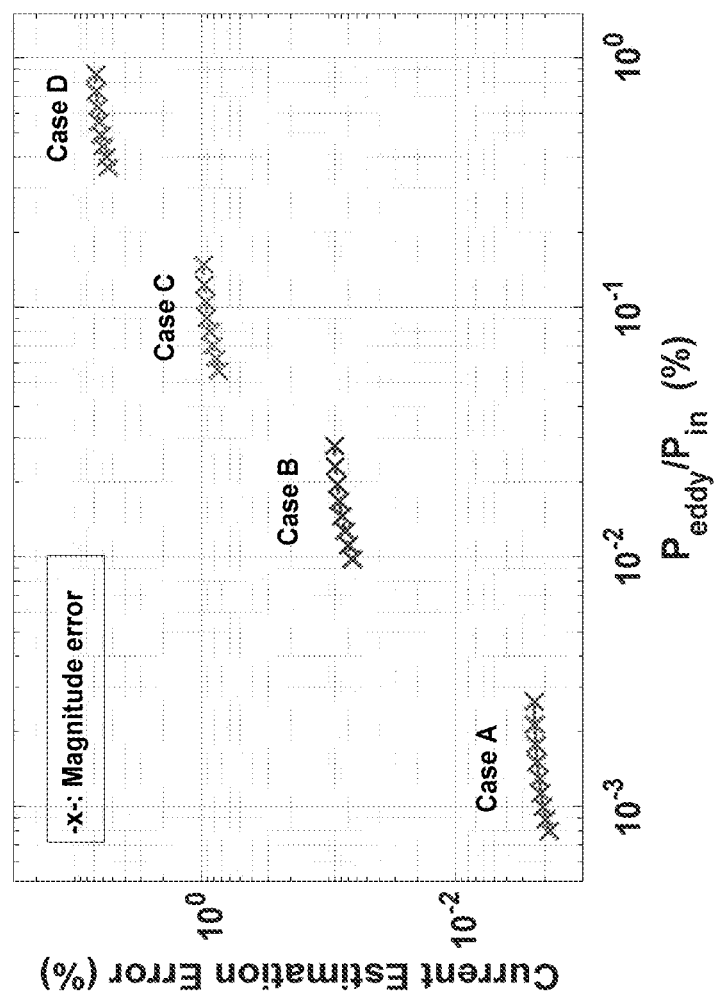
FIG. 7 depicts a graphical plot of transmitter current estimation error or offset levels relative to the ratio of the eddy losses from foreign objects to transmitter power in accordance with several examples.

Two additional data points, having higher transmitter powers ($P_{Tx}$), were also tested to show the power-level invariance of the disclosed systems and methods. In this case, the transmitter and RX coil were excited by higher currents. The transmitter coil current estimation errors were calculated through expression (15), using the same geometric parameters. The second plot of FIG. 6 shows that the estimation errors were invariant from that at low power—a low-power test, which is safer and less hazardous can now be performed prior to startup. This is so because the current estimation error only depends on the ratio of eddy losses from foreign objects to the transmitter power, as shown in FIG. 7, resulting in invariance to absolute power levels.

Examples of the above-described coil current reconstruction were accurate when there was no foreign object. For instance, the worst-case error was 0.007%. After the foreign objects were placed in the wireless power transfer system, the examples established that the detection metric increased according to the volume and position of the foreign objects. The examples thus demonstrated that the metric indicates the quantity of electromagnetic coupling to the foreign objects. For example, when a 21 mm diameter U.S. nickel coin was placed on the center, the detection metric was at least 7 times higher than the metric without a foreign object. In another example, when a 16 oz aluminum can was located in the edge, the detection metric was more than 1,000 times higher.

The metric was also shown to be invariant from low- to high-power levels. For instance, examples were tested with power levels as low as 7 W, and at a kW levels, such as 1018 W.

The manner in which the disclosed systems and methods are invariant to misalignment in the wireless power transfer system is now addressed. For robust foreign object detection, an obstructed configuration is distinguished from what are considered 'normal' deviations from the normal, unobstructed model or configuration. For example, transmitter and receiver coil misalignment is considered normal. In one example, a flat configuration of multiple sense coils on the same axis and plane may be used to eliminate estimation errors from misalignment. It is worth noting that in this method, explicit measurement of misalignment is not needed either for current estimation or calibration.

Figure 8:
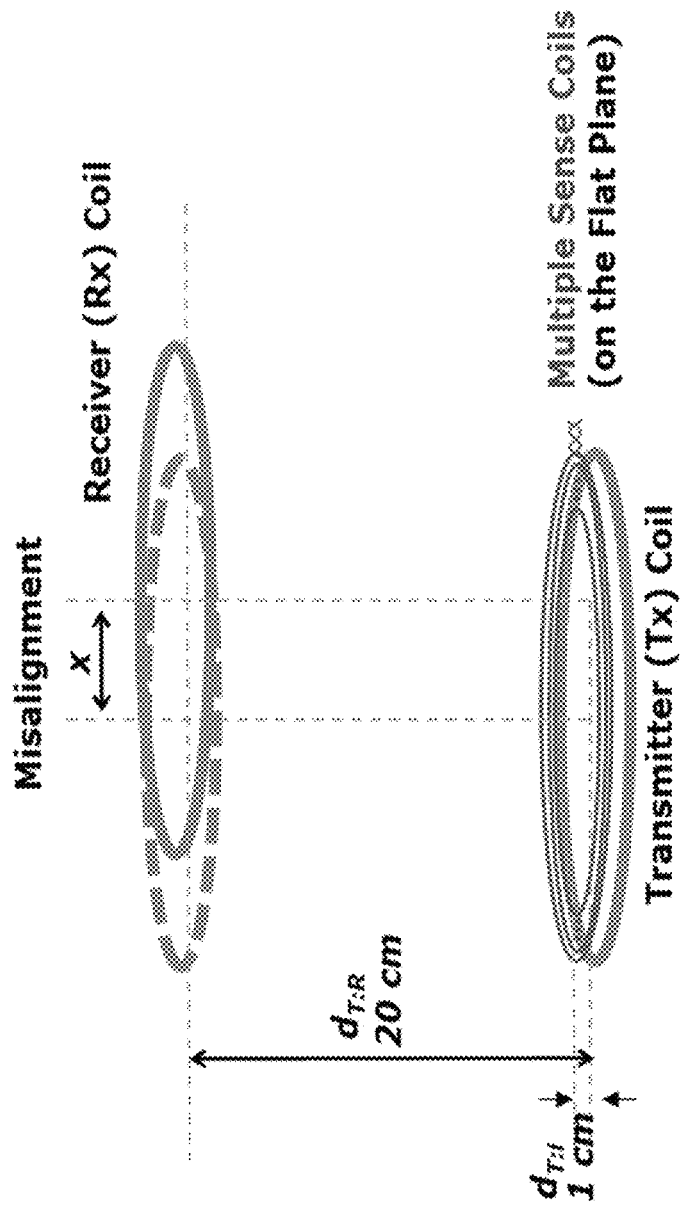
FIG. 8 is a schematic view of a wireless power transfer system with foreign object detection in accordance with an example in which transmitter and receiver coils are misaligned.
Figure 9:
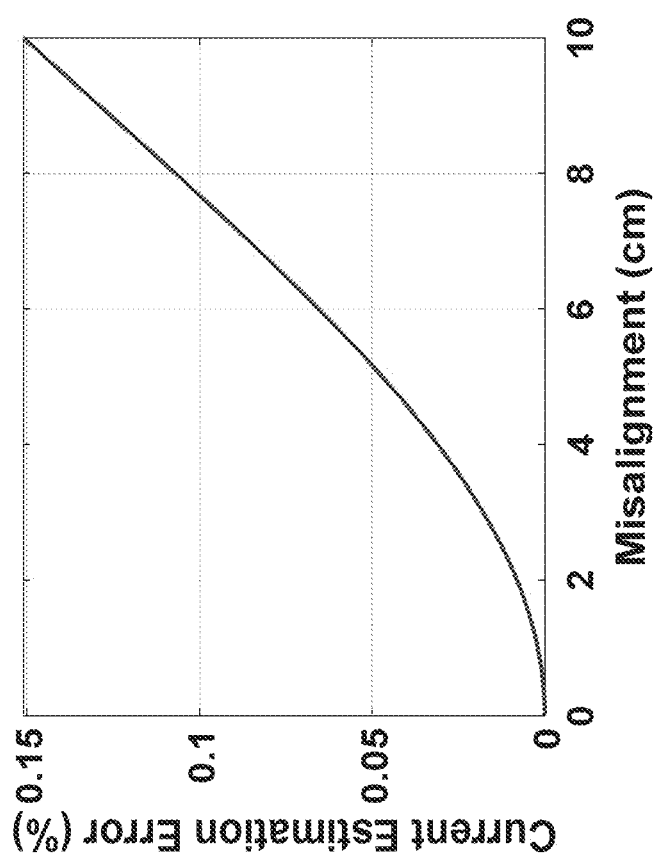
FIG. 9 depicts a graphical plot of transmitter current estimation error, or offset, as a function of misalignment in accordance with one example in which two sense coils are used.

Misalignment between the transmitter and receiver coil, an example of which is shown in FIG. 8, can also cause the transmitter current estimation error. This is so because the geometric parameters, which are a function of the mutual inductances in expression (4), vary under misalignment. However geometric parameters are calibrated initially for a fixed transmitter and receiver coil configuration and assumed constant in the normal model. FIG. 9 shows the transmitter current estimation error under misalignment in accordance with one example, when two sense coils are used. As misalignment increases, the estimation errors are higher.

By employing multiple sense coils, the misalignment error can be corrected, resulting in a new normal model that considers the misalignment to be normal. Foreign objects can be detected regardless of misalignment. Errors caused by the misalignment in Transfer-Power Measurement (TPM) may be corrected by employing multiple sense coils with the corresponding algorithm in expression (6), which is based on quadratically varying coupling coefficients between the mobile receiver coil and coaxially placed coils under misalignment, as shown in the example of FIG. 8. In the context of foreign object detection, the same multiple sense coils, which are placed coaxially to the transmitter and receiver coil (at x=0), are used to take advantage of the quadratic coupling coefficients and mutual inductances.

Further details are now provided regarding the manner in which foreign object detection is implemented in connection with misalignment.

Sense coil voltages $V_i(x)$ at misalignment x, can be represented in terms of the transmitter current ($I_T$) and voltage ($V_T$) as follows.

$$V_i(x) = j\omega M_{T:i} I_T(x) + j\omega M_{R:i}(x) I_R(x) = \quad (17)$$
$$j\omega \left( M_{T:i} - \frac{M_{R:i}(x)}{M_{T:R}(x)} L_T \right) I_T(x) + \frac{M_{R:i}(x)}{M_{T:R}(x)} V_T(x),$$

where, $$I_R(x) = \frac{V_T(x) - j\omega L_T I_T(x)}{j\omega M_{T:R}(x)}. \quad (18)$$

The mutual inductance between the transmitter coil and sense coil, $M_{T:i}$, is constant under misalignment. Expression (17) can be rewritten with the parameter $m_i(x)$ as follows.

$$V_i(x) = j\omega (M_{T:i} - m_i(x) L_T) I_T(x) + m_i(x) V_T(x), \quad (19)$$

where, $$m_i(x) = \frac{M_{R:i}(x)}{M_{T:R}(x)}. \quad (20)$$

The parameter $m_i(x)$ can be approximated as a quadratic $$m_i(x) \approx p_i + q_i x + r_i x^2, \text{ where } p, q, r \in \mathbb{R}. \quad (21)$$

A number N of sense coil voltages in expression (19) can be linearly combined by a parameter set of real coefficients, $\lambda_i$, as follows.

$$\sum_{i=1}^{N} \lambda_i \frac{V_i(x)}{j\omega} = I_T(x) \sum_{i=1}^{N} (\lambda_i M_{T:i} - \lambda_i m_i(x) L_T) + \frac{V_T(x)}{j\omega} \sum_{i=1}^{N} \lambda_i m_i(x). \quad (22)$$

The parameter set $\lambda_i$ can be chosen if $m_i(x)$ are quadratic and form an affine set as follows.

$$\sum_{i=1}^{N} (\lambda_i M_{T:i} - \lambda_i m_i(x) L_T) \approx 1, \text{ and } \sum_{i=1}^{N} \lambda_i m_i(x) \approx 0, \quad (23)$$

where, $$\sum_{i=1}^{N} \lambda_i M_{T:i} \approx 1, \sum_{i=1}^{N} \lambda_i p_i \approx 0, \sum_{i=1}^{N} \lambda_i q_i \approx 0, \sum_{i=1}^{N} \lambda_i r_i \approx 0, \quad (24)$$

The estimation of the transmitter current under misalignment x by the sense coil voltages and the parameter set of real coefficients $\lambda_i$, is as follows.

$$\sum_{i=1}^{N} \lambda_i \frac{V_i(x)}{j\omega} \approx I_T(x). \quad (25)$$

Note that new geometric parameters Xi are constant and can be initially calibrated, meaning that the transmitter current can be estimated at any misalignment x; only the geometric parameters and sense coil voltages are needed without explicit measurements of the misalignment.

A least-squares optimization may be used to obtain $\lambda_i$ as follows.

$$\underset{\lambda_i}{\text{minimize}} \left\| I_T(x) - \sum_{i=1}^{N} \lambda_i \frac{V_i(x)}{j\omega} \right\|_2 \quad (26)$$

subject to $\lambda_i \in \mathbb{R}$.

Numerical models were derived from a mutual inductance model, and used to verify the correction of the transmitter current estimation error under misalignment. Sense coil voltages were obtained by expression (1) at each misalignment x, when the transmitter and receiver coil were excited by current sources. FIG. 8 shows the configuration of the coils. Table I shows the each coil's size and position. In this example, the radii of the transmitter ($r_T$) and receiver ($r_R$) coil were 25 cm, where the two coils were separated by 20 cm ($d_{T:R}$). Multiple sense coils were placed on a flat plane, which was 1 cm ($d_T$:i) above the transmitter coil. The number of sense coils, used for the estimation, was varied from two to five to show the effectiveness of employing an increasing number of sense coils for misalignment error correction. In these cases, the radii of sense coils 1 to 5 ($r_1$ to $r_5$) were 25 to 20 cm, respectively, decreasing at 1 cm intervals. The correction of errors of up to 10 cm lateral misalignment was achieved.

For the calibration of geometric parameters $\lambda_i$, numerical data was obtained over: (i) n data points of the receiver current (corresponding to different load resistance); (ii) m data points of misalignment (not necessarily uniform). The calibration matrix and vector can then be constructed to solve the least squares optimization in expression (26), when there are N sense coils, as follows.

$$\underline{V} = [\underline{v(0)} \quad \underline{v(1)} \quad \ldots \quad \underline{v(m)}]^T, \quad (27)$$

$$\underline{I_T} = [\underline{i_T(0)} \quad \underline{i_T(1)} \quad \ldots \quad \underline{i_T(m)}]^T,$$

$$\underline{v(x)}^T = \frac{1}{j\omega} \begin{pmatrix} V_1(1, x) & V_2(1, x) & \ldots & V_N(1, x) \\ V_1(2, x) & V_2(2, x) & \ldots & V_N(2, x) \\ \vdots & \vdots & \ddots & \vdots \\ V_1(n, x) & V_2(n, x) & \ldots & V_N(n, x) \end{pmatrix}, \quad (28)$$

$$\underline{i_T(x)} = [I_T(1, x) \quad I_T(2, x) \quad \ldots \quad I_T(n, x)],$$

$$\underline{\lambda} = [\lambda_1 \quad \lambda_2 \quad \ldots \quad \lambda_N]^T,$$

Following expression (25), the following expression applies.

$$\underline{I_T} = \underline{V}\underline{\lambda}. \quad (29)$$

The geometric parameters ($\lambda_i$) can then be calibrated using the least-squares expression as follows.

$$\underline{\lambda} = (\underline{V}^T \underline{V})^{-1} \underline{V}^T \underline{I_T} \quad (30)$$

The transmitter current estimation errors ($\delta_{I(x)}$) were determined for each data point using LOOCV. The percentage error of the transmitter current estimation under misalignment was calculated as follows.

$$\delta_{I(x)} = \left| \frac{I_T(x) - I_{T,est.}(x)}{I_T(x)} \right| \times 100(\%) \quad (31)$$

$$I_{T,est.}(x) : \text{Estimated } Tx \text{ current} = \sum_{i=1}^{N} \lambda_i \frac{V_i(x)}{j\omega} \quad (32)$$

Figure 10:
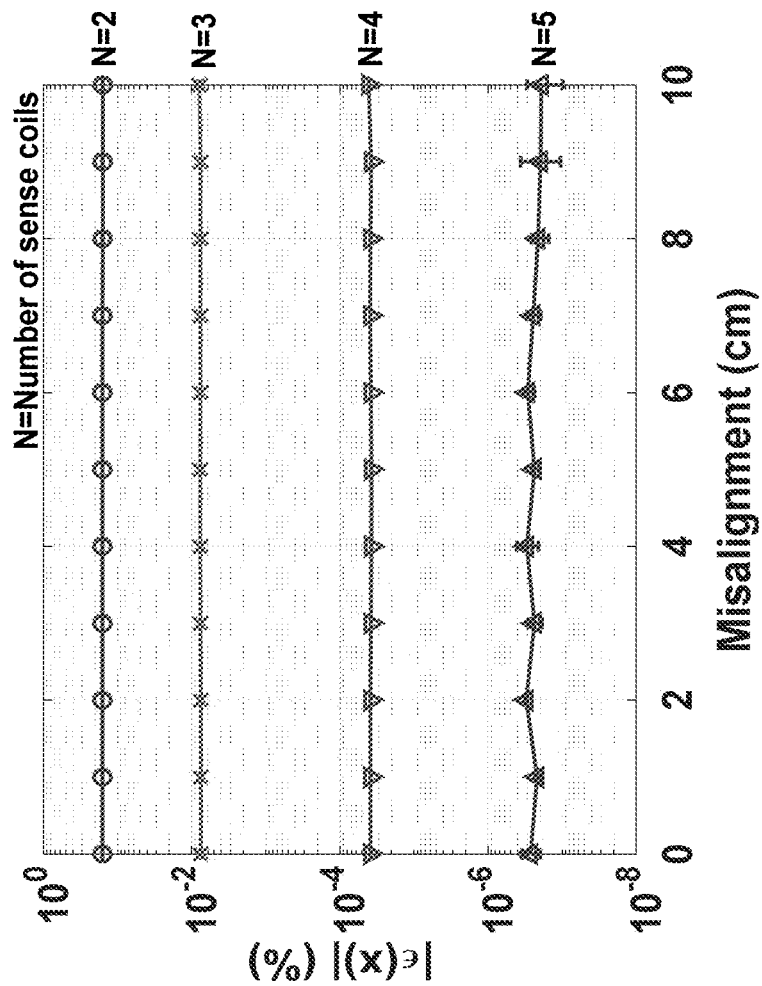
FIG. 10 depicts a graphical plot of transmitter current estimation error, or offset, as a function of misalignment in accordance with several examples having a varying number of sense coils.

In this numerical model verification, nine data points of the receiver current and 11 data points of misalignment (0 to 10 cm, 1 cm interval) were used to calibrate the parameter set $\lambda_i$. FIG. 10 shows that the transmitter current estimation errors were nearly invariant to misalignment. Moreover, as more sense coils were employed, the errors decreased significantly; $10^{-6}\%$ error, when five sense coils were used (green-upright triangles). The errors were due to deviations from quadratic dependence in and the affine set of the mutual inductance.

Figure 11:
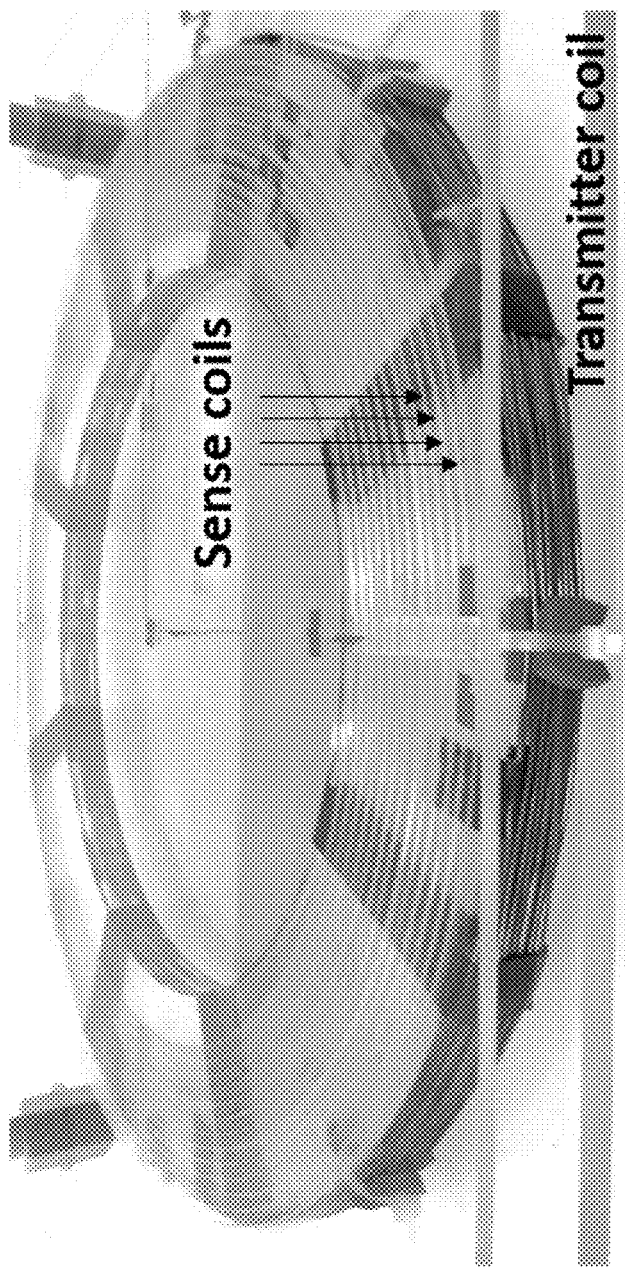
FIG. 11 is a perspective, partial view of a wireless power transfer system having multiple single-turn sense coils placed above a transmitter coil in accordance with one example.
Figure 12:
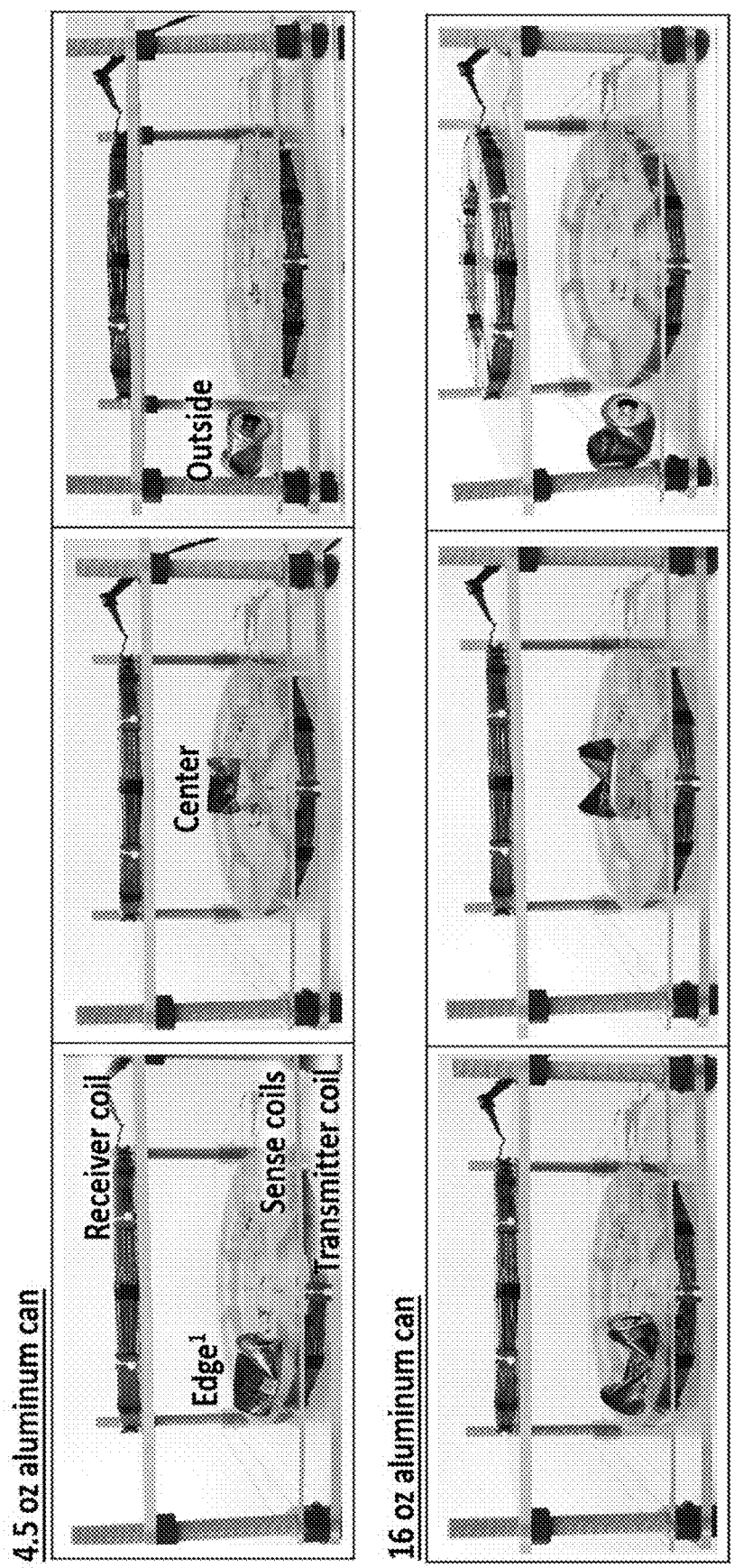
FIG. 12 depicts several perspective views of a wireless power transfer system in accordance with another example in which an aluminum can is disposed at different locations (edge, center, and outside) relative to a transmitter coil.
Figure 13:
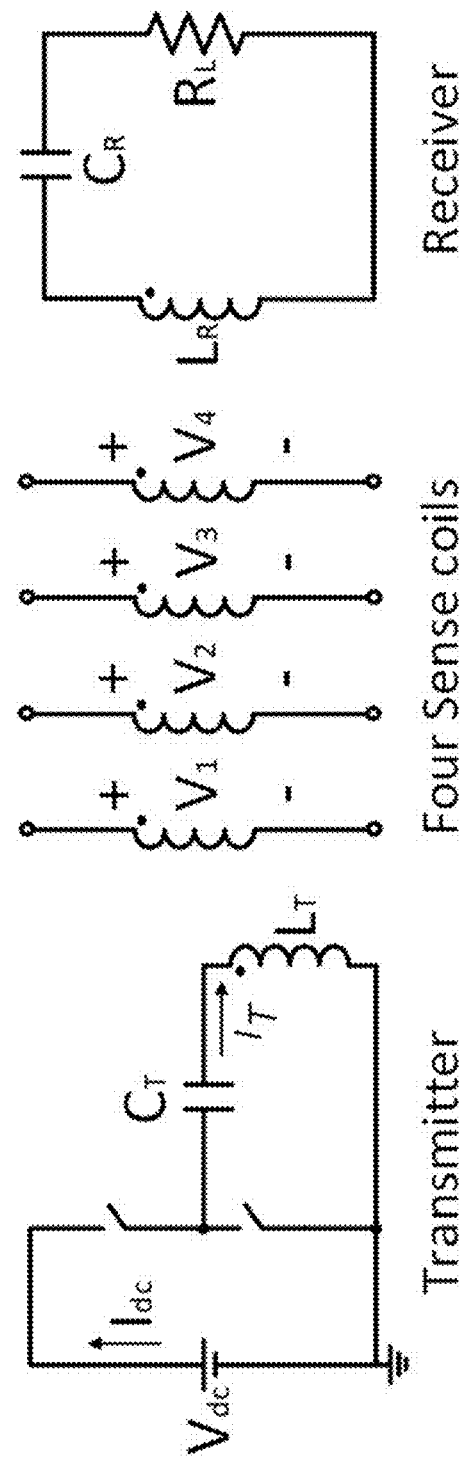
FIG. 13 is a schematic view of a series-series resonant wireless power transfer system in which two or four sense coil are used for foreign object detection and misalignment-invariant foreign object detection, respectively, in accordance with one example.

The foreign object detection of the disclosed systems and methods was demonstrated in hardware. In this example, coaxial wires having a gauge of 42 AWG (0.06335 mm outer diameter) were used for the sense coils. The sense coils were single-turn, open-circuited, and placed on or in the same plane, which was 2 cm above the transmitter coil, as shown in FIG. 11. In this example, two sense coils (21.5 and 19.5 cm radii) were used to estimate the transmitter current, where the radii of the transmitter and receiver coils were 23 cm each. The geometric parameters $\alpha_{1,2}$ in the normal model in expression (4), without foreign objects, were calibrated by four different resistive loads ($R_L$=15, 20, 30, and 40Ω) in the receiver output, as shown in FIG. 13. After calibration, two different aluminum cans (4 oz and 16 oz) were placed in three different locations above the transmitter coil, as shown in FIG. 12. The transmitter coil current estimation percentage errors were calculated for both cases with and without foreign objects. The input dc power supply voltage (Vdc) was 25 V, and the operating frequency for the wireless power transfer was 90 kHz, as specified in SAE standard J2954. Voltage and current were measured on an Elsys TraNET 204E, which provided 20 MHz sampling frequency with 16-bit resolution.

Figure 14:
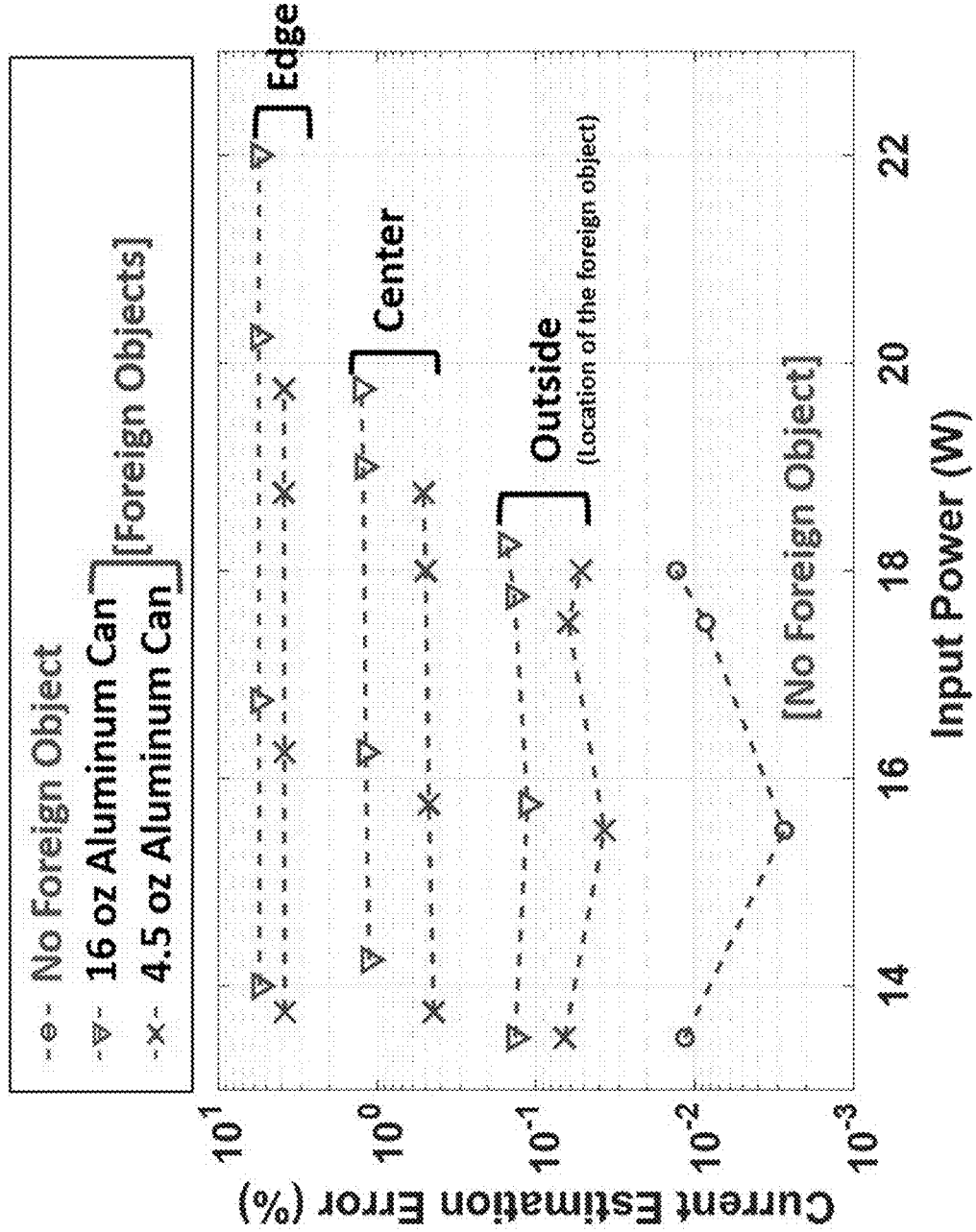
FIG. 14 depicts a graphical plot of current estimation error, or offset, level relative to input power in accordance with an example having two sense coils, and for which the location of the foreign object is varied.
Figure 15:
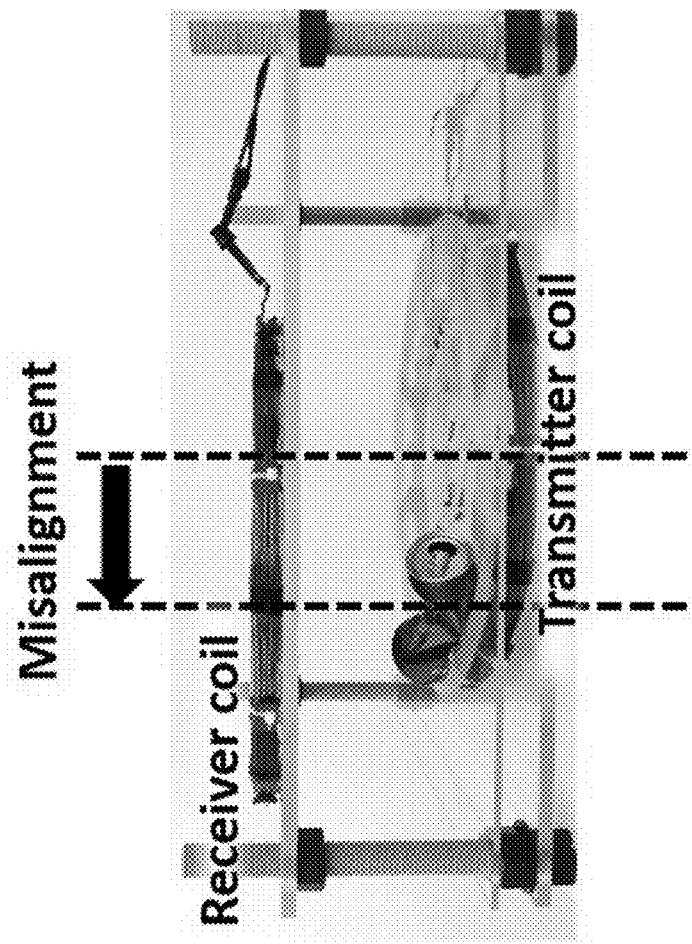
FIG. 15 is a perspective view of a wireless power transfer system with foreign object detection despite misalignment of a receiver coil in accordance with one example.

FIG. 14 shows the experimental results. The percentage errors were, to within experimental precision, invariant to the power levels. The transmitter current estimation was accurate (0.01% of the worst case error) when there was no foreign object. After the aluminum cans were placed in the wireless power transfer system, the error increased according to the volume and position of the cans, which demonstrated that the error indicates the quantity of electromagnetic coupling to the foreign objects. The errors are plotted in logscale. The percentage errors, caused by foreign objects, were at least 40 times higher than the errors without foreign objects, when they were within the boundaries of wireless power transfer, e.g. edge and center (FIG. 12), and approximately a factor of 5 when the foreign objects were outside the transmitter coil. Furthermore, foreign objects were detected even when the input power levels were low (below 22 W), meaning that a kW-level full-power test, which may be high-risk, is not necessarily needed.

Misalignment invariant foreign object detection was demonstrated in hardware using four-sense coils (radii of 22.5, 21.5, 20.5, 19.5 cm), which were placed on the same flat plane, as shown in FIG. 11. A 16 oz aluminum can at the edge of the transmitter coil was tested with up to 10 cm lateral misalignment (based on the test points in SAE J2954) of the receiver coil. Calibration of the geometric parameter set, $\lambda_i$, was performed when there was no foreign object. Calibration matrices of sense coil voltage and the transmitter current, formulated in expression (28), were constructed from 24 data points; 4 data points from the resistive loads in the receiver output (15, 20, 30, and 40Ω), were measured at each misalignment point (6 data points: 0 to 10 cm, 2 cm interval).

After the calibration, the aluminum can was placed, and the transmitter currents were estimated again at each misalignment, using the same geometric parameter set, $\lambda_i$.

Figure 16:
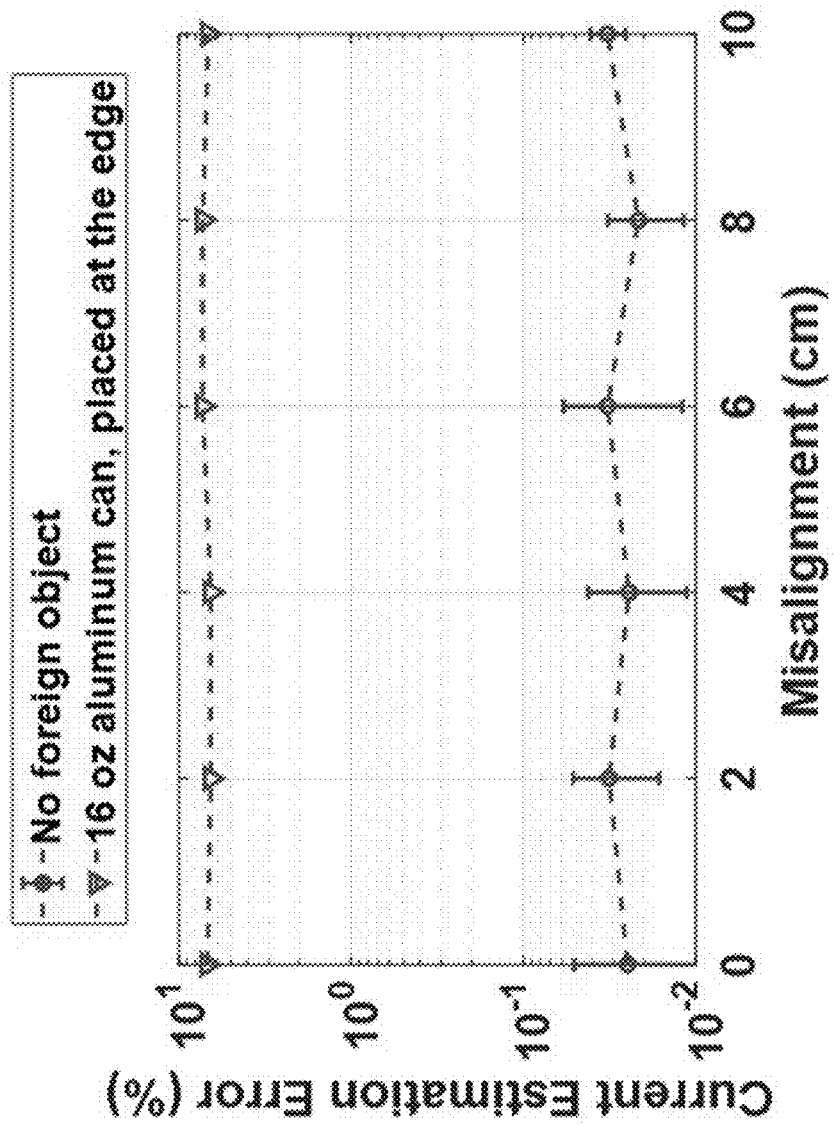
FIG. 16 depicts a graphical plot of current estimation error, or offset, level relative to misalignment in accordance with the example of FIG. 15.

FIG. 16 shows the hardware results. When there is no foreign object, the transmitter currents are estimated accurately (0.06% worst case error) under misalignment. Furthermore, the errors still increase significantly when there is a foreign object (purple inverted triangles). Both errors are very nearly consistent under misalignment, which demonstrates misalignment invariant foreign object detection.

Figure 17:
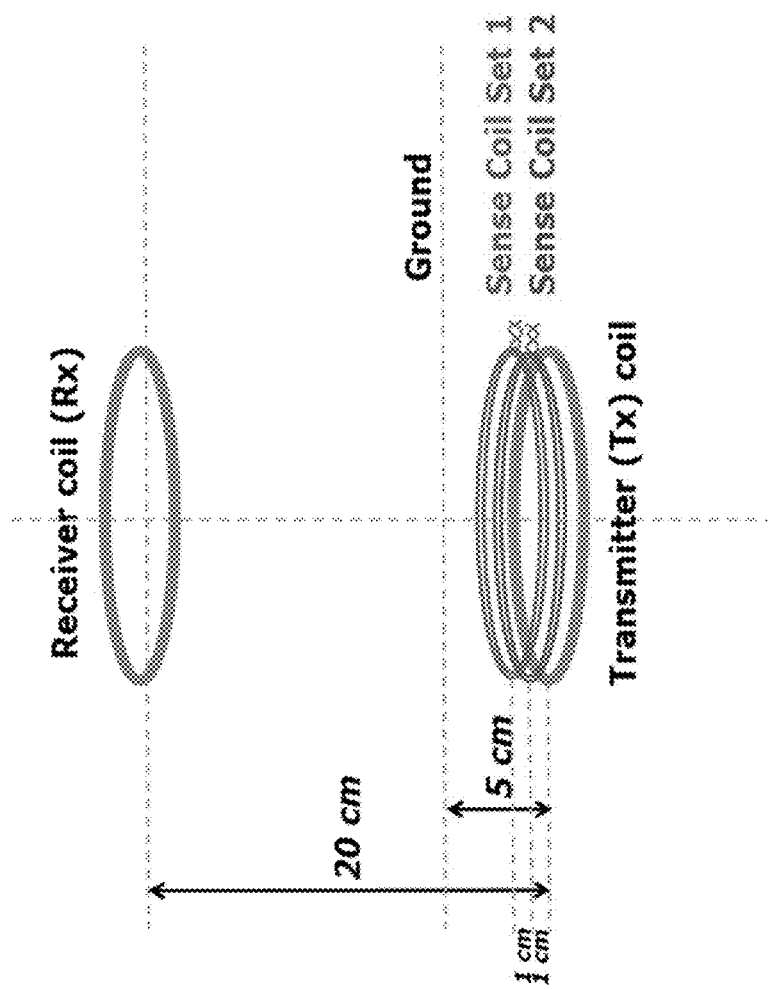
FIG. 17 is a schematic view of a wireless power transfer system with multiple sets of sense coils for foreign object detection in accordance with one example.

FIG. 17 depicts a wireless transfer system having multiple sets of sense coils in accordance with one example. Each set of sense coils includes multiple sense coils. In this example, two sets are included, with each set including two sense coils. The number of sets, and the number of sense coils in each set, may vary. The arrangement, configuration, and other characteristics of the sense coils and sense coil sets may vary as described herein.

Each set of sense coils may be used to support an assessment of the current level in a transfer coil (e.g., either the transmitter coil or the receiver coil) of the wireless power transfer system. One of the assessments may replace the measurement of the transfer coil current level in the above-described foreign object detection technique.

Figure 18:
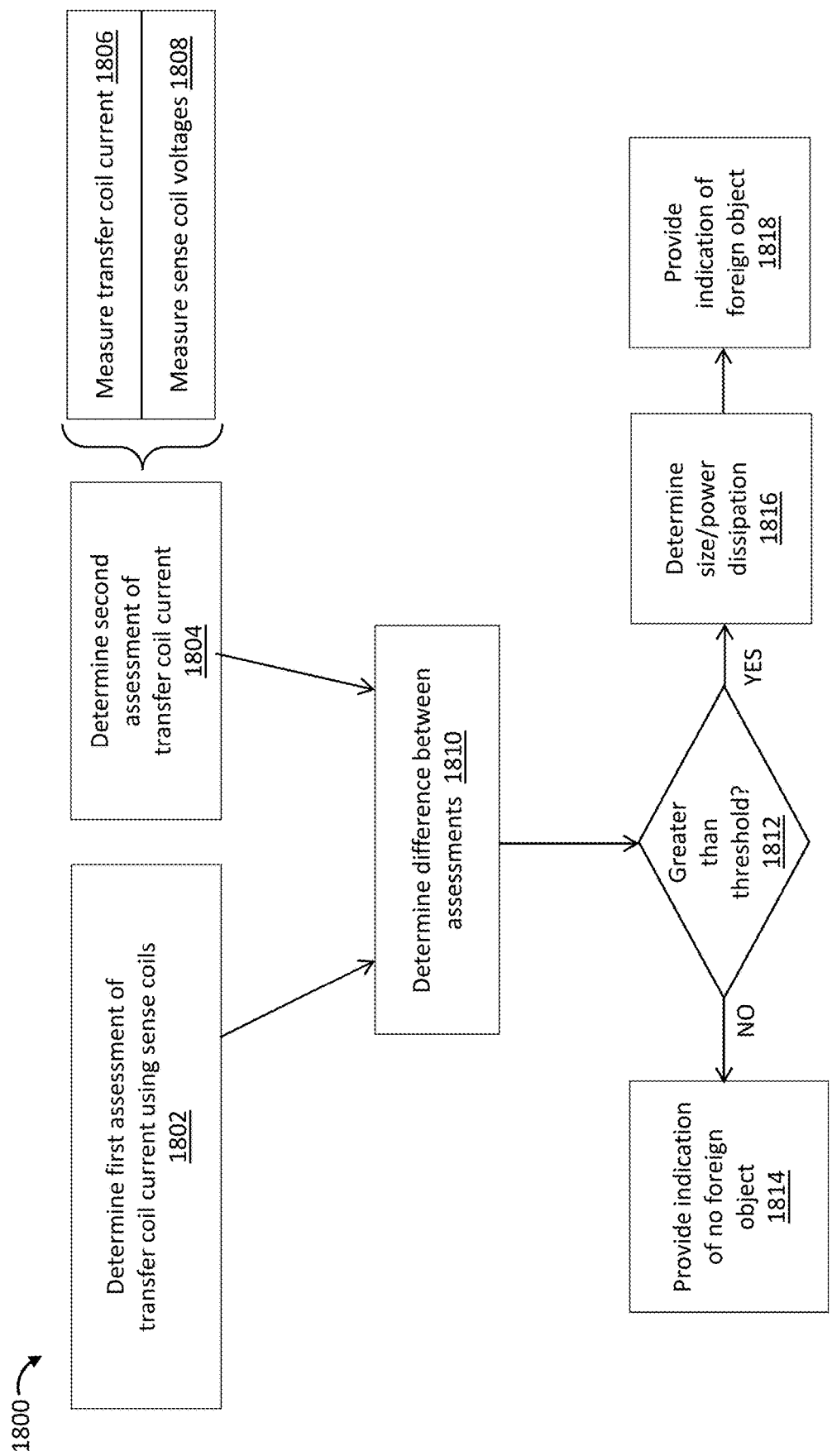
FIG. 18 is a flow diagram of a method of foreign object detection in a wireless power transfer system in accordance with one example.

FIG. 18 depicts a method 1800 for foreign object detection in a wireless power transfer system in accordance with one example. The method 1800 may be implemented by one or more processors, including, for instance, the processor described in connection with the example of FIG. 20.

Using a plurality of sense coils of the wireless power transfer system, a first assessment of a current level in a transfer coil of the wireless power transfer system is determined in an act 1802. Each sense coil of the plurality of sense coils is positioned relative to the transfer coil to generate sensor data indicative of a field implementing wireless power transfer via the transfer coil, as described herein. A second assessment of the current level in the transfer coil is determined in an act 1804.

In some cases, determining the second assessment includes an act 1806 in which the current level in the transfer coil is measured with a transfer coil current sensor. In this approach, a measured transfer coil current is compared with an estimated transfer coil current determined via a sense coil set. One sense coil set (multiple sense coils) is used. Calibration of the system parameters is initially performed in the normal model (without foreign objects). The parameters contain the magnetic and geometric information among the transmitter, receiver, and sense coils. After calibration, foreign object detection uses measurements of the transfer coil current and the sense coil voltages. An estimation of the transfer coil current is constructed from a linear combination of the sense coil voltages using the pre-calibrated system parameters. Foreign objects are detected from the error, or offset, between the measured and estimated transfer coil current. A foreign object in the electromagnetic space causes an error from the additional coupling between the foreign object and other coils.

The manner in which the second assessment is obtained may vary. For instance, in another example, multiple (e.g., two) sense coil sets are used. In some cases, determining the second assessment includes an act 1808 in which the second assessment is determined based on further sensor data generated by a second plurality of sense coils of the wireless power transfer system. Each sense coil of the second plurality of sense coils is positioned relative to the transfer coil such that the further sensor data is indicative of the field. In this case, no transmitter or other transfer coil current measurement is used. Calibration of the system parameters for the two sense coil sets is initially performed in the normal model (without foreign objects). In the normal model, estimation of the transfer current from the first sense coil set and second sense coil will be accurate and similar. After calibration, foreign object detection uses measurement of the sense coil voltages from both sets. Two estimations of the transfer coil current is constructed from the two sense coil sets. Two linear combinations of the sense coli voltages are determined using the pre-calibrated system parameters. Foreign objects are detected from the error, or offset, between the two estimated transfer coil currents from the first and second sense coil sets.

In an act 1810, an offset or difference between the first assessment and the second assessment is then determined. A decision block 1812 then determines whether the offset exceeds a threshold. An indication of whether a foreign object is obstructing the wireless power transfer is then provided based on whether the offset exceeds the threshold. In the example of FIG. 18, if the difference is not greater than the threshold, then control passes to an act 1814 in which an indication of no foreign object is provided. If the difference is greater than the threshold, then control passes to an act 1816 (described below) and an act 1818 in which an indication of a foreign object is provided.

In some cases, the method 1800 also includes determining an amount of power dissipated in the foreign object based on the sensor data. In the example of FIG. 18, the power dissipation is determined in the act 1816. For instance, a linear combination of the products of different sense coil voltages may be used to determine the power dissipated in the foreign object, as described in the above-referenced publication of transfer power measurement techniques. In other instances, power dissipation can be estimated sense coil voltages using prior assumptions about mutual inductances of the foreign object relative to the transmitter, receiver, and/or sense coils. In other instances, the relationship between sense coil voltages and power dissipation in the foreign object may be determined from calibration and/or electromagnetic simulation using for instance regression, curve fitting, least-squares, and/or machine learning. The indication may then specify whether the amount of power dissipated in the foreign object exceeds a threshold.

The method 1800 may include additional, fewer or alternative acts. For instance, the method 1800 may not include a determination of the power dissipation. In some cases, the order of the acts may vary from the example shown.

Figure 19:
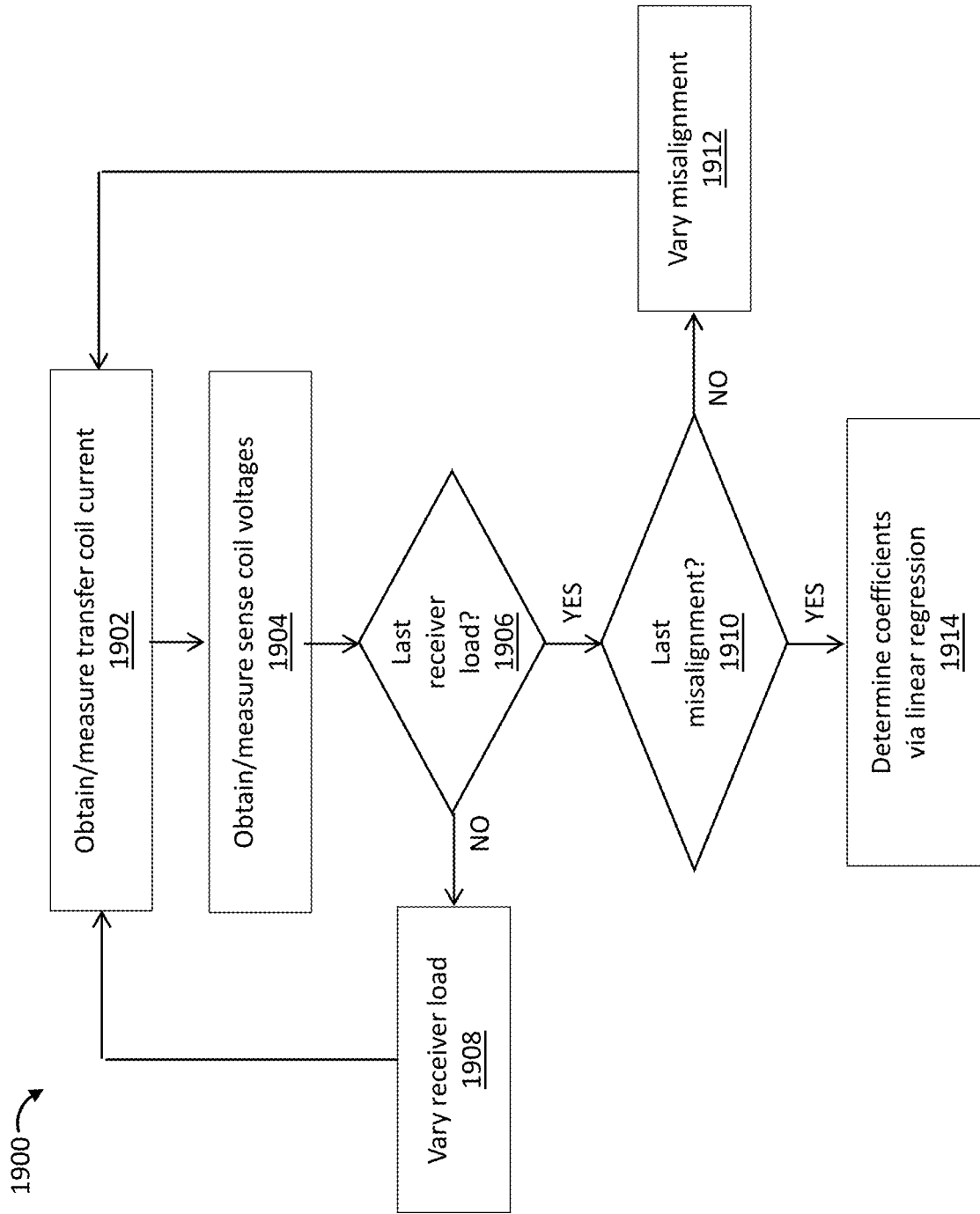
FIG. 19 is a flow diagram of a method of calibrating a wireless power transfer system for foreign object detection in accordance with one example.

FIG. 19 depicts a method 1900 of calibrating a wireless power transfer system for foreign object detection in accordance with one example. The method 1900 may be implemented by one or more processors, including, for instance, the processor described in connection with the example of FIG. 20.

Sensor data indicative of a field implementing wireless power transfer is obtained in an act 1902. The sensor data may be generated by a plurality of sense coils. Each sense coil of the plurality of sense coils is positioned relative to a plurality of transfer coils of the wireless power transfer system, as described above. The sensor data is generated without a foreign object present. Alternatively or additionally, sense coil voltages are measured or otherwise obtained in an act 1904.

An assessment of the current level in a respective transfer coil of the plurality of transfer coils is obtained. The assessment is representative of operation of the wireless power transfer system without a foreign object present.

The method 1900 includes an act 1914 in which a set of coefficients is determined to translate the obtained sensor data into a further assessment of the current level in the respective transfer coil. The further assessment is representative of operation of the wireless power transfer system without a foreign object present. In some cases, determining the set of coefficients includes implementing a linear regression optimization based on the sensor data. For example, the linear regression optimization may be or otherwise include a least squares optimization.

As shown in FIG. 19, the sensor data and the assessment of the current level may be obtained for a range of loads on the wireless power transfer system. A decision block 1906 determines whether sensor data for the last receiver has been obtained. If not, then control passes to an act 1908 in which the receiver load is varied. Further sensor data is then measured or otherwise obtained as described above.

Alternatively or additionally, the sensor data and the assessment of the current level are obtained over a range of misalignment in the wireless power transfer system. In the example of FIG. 19, a decision block 1910 determines whether sensor data for the last misalignment has been obtained. If not, then control passes to an act 1912 in which the misalignment is varied. Further sensor data is then measured or otherwise obtained as described above.

The method 1900 may include additional, fewer or alternative acts. For instance, the method 1900 may not include varying for misalignment. In some cases, the order of the acts may vary from the example shown. For instance, the data may be obtained by the processor in a different order.

Figure 20:
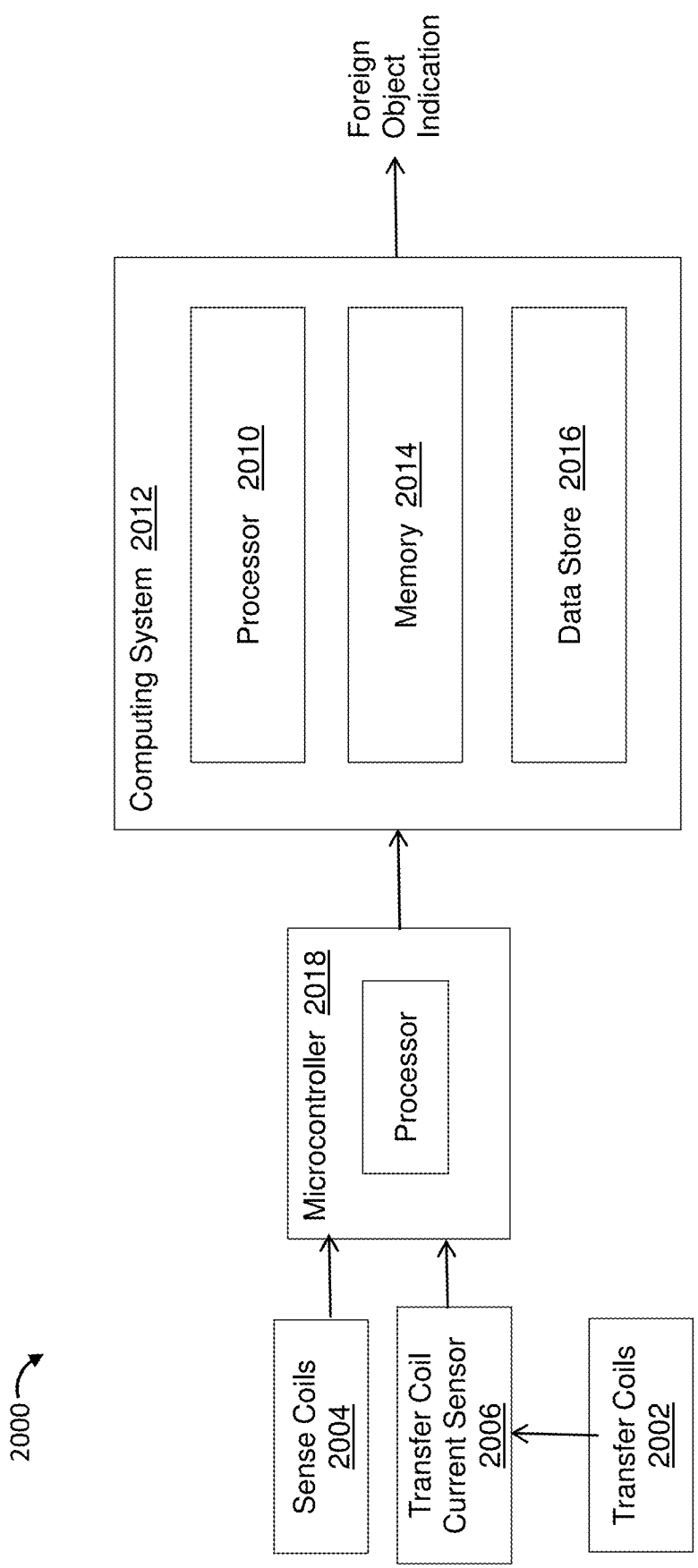
FIG. 20 is a block diagram of a wireless power transfer system configured for implementation of a method of foreign object detection in wireless power transfer, such as one or both of the methods of FIGS. 18 and 19.

FIG. 20 depicts a system 2000 for wireless power transfer in accordance with one example. The system 2000 includes a plurality of transfer coils 2002. Each transfer coil 2002 of the plurality of transfer coils is configured as a transmitter for the wireless power transfer or a receiver for the wireless power transfer.

The system 2000 further includes a plurality of sense coils 2004. Each sense coil 2004 of the plurality of sense coils is positioned relative to the plurality of transfer coils 2002 and configured to generate sensor data indicative of a field implementing the wireless power transfer. The sensor data may include data representative of an open circuit voltage across each sense coil 2004 of the plurality of sense coils. In some cases, the plurality of sense coils 2004 includes more than two sense coils such that a processor (described below) is configured to determine whether a foreign object is affecting the wireless power transfer over a range of misalignment between the plurality of transfer coils.

In some cases, each sense coil 2004 of the plurality of sense coils is positioned between the plurality of transfer coils 2002. Each sense coil 2004 of the plurality of sense coils may be disposed in a co-planar arrangement. Other sense coil positioning may be used.

Each sense coil 2004 of the plurality of sense coils may include a single turn coil, but the configuration and other characteristics of the sense coils may vary.

In the example of FIG. 20, the system 2000 includes a transfer coil current sensor 2006 configured to generate a measurement of the current level in a respective transfer coil. In some cases, the respective transfer coil is configured as a transmitter coil. Alternatively, the respective transfer coil is configured as a transmitter coil.

Alternatively or additionally, the sense coils 2004 may include a second plurality of sense coils. Each sense coil of the second plurality of sense coils is positioned relative to the plurality of transfer coils 2002 and configured to generate further sensor data indicative of the field representative of the wireless power transfer. In such cases, a processor (described below) is coupled to the second plurality of sense coils and configured to determine a further estimate of the current level in the respective transfer coil based on the further sensor data, and to determine whether a foreign object is affecting the wireless power transfer based on the further estimate.

The system 2000 includes a processor 2010 coupled to the plurality of sense coils. The processor 2010 is configured to determine an estimate of a current level in a respective transfer coil 2002 of the plurality of transfer coils based on the sensor data, and to determine whether a foreign object is affecting the wireless power transfer based on whether the estimated current level is offset from another assessment (e.g., a measurement or another estimate) of the current level by more than a threshold. In the example of FIG. 20, the processor 2010 is part of a computing system 2012 having a memory 2014 in which instructions for the data processing (e.g., calibration processing, estimate determination, and threshold comparison) are stored, and a data store 2016 in which data to support the processing (e.g., system coefficient data) is stored. The computing system 2012 may include one or more additional, fewer, or alternative elements. For instance, the computing system 2012 may include an output device to provide an indication of whether a foreign object is detected.

In the example of FIG. 20, the computing system 2012 is coupled to the sense coils 2004 and the other components of the wireless power transfer system by a further processor 2018. In this case, the further processor 2018 is configured as a microcontroller. The memory and data store may also be part of the microcontroller 2018 in other embodiments. The microcontroller 2018 may be configured to receive and process data captured by the sense coils 2004 and the transfer coil current sensor 2006.

In some cases, the processor 2010 of the computing system 2012 is further configured to determine an amount of power dissipated in the foreign object based on the sensor data. In such cases, the processor 2010 may be further configured to provide an indication of whether the amount of power dissipated in the foreign object exceeds a threshold. The threshold may be predetermined such that exceeding the threshold corresponds with a dangerous condition for the wireless power transfer system to be avoided.

The functionality of the microcontroller 2018 and the computing system 2012 may be integrated to any desired extent.

The disclosed methods and systems provide robust and effective electromagnetic model based foreign object detection with wide dynamic range, which is invariant to power level, misalignment, and wireless power transfer coil loss. The disclosed methods and systems provide a metric for foreign object detection that uses the deviation of an adverse model from a calibrated normal model. Foreign objects are detected by quantifying the deviation from a normal model. This deviation is caused by the foreign object's additional electromagnetic coupling. Advantages of this new method include invariance to power level allowing low-power tests prior to startup, receiver coil misalignment, and varying transmitting and receiver losses.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A system for wireless power transfer, the system comprising:
   a plurality of transfer elements, each transfer element of the plurality of transfer elements being configured as a transmitter for the wireless power transfer or a receiver for the wireless power transfer;
   a plurality of sensors, each sensor of the plurality of sensors being positioned relative to the plurality of transfer elements and configured to generate sensor data indicative of a field implementing the wireless power transfer;
   a power transfer coil current sensor configured to generate a measurement of a terminal current level in a respective transfer element of the plurality of transfer elements; and
   a processor coupled to the plurality of sensors and configured to determine an estimate of a terminal current level during the wireless power transfer in a respective transfer element of the plurality of transfer elements based on the sensor data, and to determine whether a foreign object is affecting the wireless power transfer based on whether the estimated terminal current level is different from the measurement of the terminal current level during the wireless power transfer by more than a threshold.

2. The system of claim 1, wherein each transfer element of the plurality of transfer elements comprises a transfer coil.

3. The system of claim 1, wherein each sensor of the plurality of sensors comprises a sense coil.

4. A system for wireless power transfer, the system comprising:
   a plurality of transfer elements, each transfer element of the plurality of transfer elements being configured as a transmitter for the wireless power transfer or a receiver for the wireless power transfer;
   a plurality of sensors, each sensor of the plurality of sensors being positioned relative to the plurality of transfer elements and configured to generate sensor data indicative of a field implementing the wireless power transfer;
   a processor coupled to the plurality of sensors and configured to determine an estimate of a terminal variable level during the wireless power transfer in a respective transfer element of the plurality of transfer elements based on the sensor data, and to determine whether a foreign object is affecting the wireless power transfer based on whether the estimated terminal variable level is different from another assessment of the terminal variable level during the wireless power transfer by more than a threshold; and a transfer coil current sensor configured to generate a measurement of the terminal variable level in the respective transfer element, wherein the processor is configured to determine whether the foreign object is affecting the wireless power transfer based on whether the estimated terminal variable level is different from the measurement of the terminal variable level.

5. The system of claim 1, further comprising a second plurality of sensors, each sensor of the second plurality of sensors is positioned relative to the plurality of transfer elements and configured to generate further sensor data indicative of the field representative of the wireless power transfer, wherein:

the processor is coupled to the second plurality of sensors and configured to determine a further estimate of the terminal current level in the respective transfer element based on the further sensor data, and to determine whether the foreign object is affecting the wireless power transfer based on the further estimate.

6. The system of claim 1, wherein the plurality of sensors comprises more than two sensors such that the processor is configured to determine whether the foreign object is affecting the wireless power transfer over a range of misalignment between the plurality of transfer elements.

7. The system of claim 1, wherein the processor is further configured to determine an amount of power dissipated in the foreign object based on the sensor data.

8. The system of claim 7, wherein the processor is further configured to provide an indication of whether the amount of power dissipated in the foreign object exceeds a threshold.

9. The system of claim 1, wherein the sensor data comprises data representative of an open circuit voltage across each sensor of the plurality of sensors.

10. The system of claim 1, wherein the respective transfer element is configured as a transmitter coil.

11. The system of claim 1, wherein the respective transfer element is configured as a receiver coil.

12. The system of claim 1, wherein each sensor of the plurality of sensors is positioned between the plurality of transfer elements.

13. The system of claim 1, wherein each sensor of the plurality of sensors is disposed in a co-planar arrangement.

14. The system of claim 1, wherein each sensor of the plurality of sensors comprises a single turn coil.

15. A method for foreign object detection in a wireless power transfer system, the method comprising:

determining, by a processor, during wireless power transfer, using a plurality of sensors of the wireless power transfer system, a first assessment of a terminal current level in a transfer element of the wireless power transfer system, each sensor of the plurality of sensors being positioned relative to the transfer element to generate sensor data indicative of a field implementing wireless power transfer via the transfer element;

determining, during the wireless power transfer, a second assessment of the terminal current level in the transfer element;

determining, by the processor, a difference between the first assessment and the second assessment; and providing, by the processor, an indication of whether a foreign object is obstructing the wireless power transfer based on whether the difference exceeds a threshold;

wherein determining the second assessment comprises measuring, with a power transfer coil current sensor, the terminal current level in the transfer element.

16. The method of claim 15, further comprising generating further sensor data generated by a second plurality of sensors of the wireless power transfer system, each sensor of the second plurality of sensors being positioned relative to the transfer element such that the further sensor data is indicative of the field.

17. The method of claim 15, further comprising determining, by the processor, an amount of power dissipated in the foreign object based on the sensor data.

18. The method of claim 17, wherein the indication specifies whether the amount of power dissipated in the foreign object exceeds a threshold.

* * * * *